US011115546B2

(12) United States Patent
Horiike et al.

(10) Patent No.: US 11,115,546 B2
(45) Date of Patent: Sep. 7, 2021

(54) IMAGE PROCESSING APPARATUS, CONTROL METHOD TO EXECUTE PLURALITY OF FUNCTIONS FOR AN IMAGE PROCESSING APPARATUS, AND STORAGE MEDIUM

(71) Applicant: CANON KABUSHIKI KAISHA, Tokyo (JP)

(72) Inventors: Yoshiteru Horiike, Kawasaki (JP); Nobuaki Fukasawa, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/674,961

(22) Filed: Nov. 5, 2019

(65) Prior Publication Data

US 2020/0162628 A1 May 21, 2020

(30) Foreign Application Priority Data

Nov. 15, 2018 (JP) ............................. JP2018-214683

(51) Int. Cl.

*H04N 1/00* (2006.01)
*G06F 3/0482* (2013.01)
*G06F 3/12* (2006.01)

(52) U.S. Cl.

CPC ....... *H04N 1/00477* (2013.01); *G06F 3/0482* (2013.01); *G06F 3/1204* (2013.01); *G06F 3/1222* (2013.01); *G06F 3/1238* (2013.01); *G06F 3/1254* (2013.01); *H04N 1/00244* (2013.01); *G06F 3/1288* (2013.01)

(58) Field of Classification Search

None
See application file for complete search history.

(56) References Cited

U.S. PATENT DOCUMENTS

2006/0285142 A1 12/2006 Cho
2010/0238482 A1 9/2010 Tsukada
2011/0161794 A1 6/2011 Shiohara
2012/0327463 A1* 12/2012 Mizuno ................. G06F 3/1288 358/1.15
2013/0335770 A1* 12/2013 Yasukawa ............. G06F 3/1285 358/1.14
2016/0124693 A1 5/2016 Okuma
2016/0364183 A1* 12/2016 Saito ..................... G06F 3/1274

FOREIGN PATENT DOCUMENTS

JP 2015-22651 A 2/2015

* cited by examiner

*Primary Examiner* — Thomas D Lee
(74) *Attorney, Agent, or Firm* — Canon U.S.A., Inc., IP Division

(57) ABSTRACT

According to an aspect of the present invention, an image processing apparatus includes an identifying unit configured to identify a plurality of files associated with a software key. In a case where the plurality of files identified by the identifying unit includes a missing file, an application is executed on an existing file included in the plurality of files identified by the identifying unit.

19 Claims, 24 Drawing Sheets

FIG.18

| HISTORY BUTTON | FUNCTION TYPE | SETTING 1 | SETTING 2 | . . . | LOCATION | FILE NAME | DOCUMENT ID |
|---|---|---|---|---|---|---|---|
| HISTORY BUTTON A | USE OF SAVED FILE: PRINT | COLOR: AUTOMATIC | SHEET SIZE: A4 | | /folder/aaa | A.pdf | |
| | | | | | | B.pdf | |
| | | | | | | D.pdf | |
| | | | | | | E.pdf | |
| | | | | | | F.pdf | |
| | | | | | | P.pdf | |
| | | | | | | Q.pdf | |
| HISTORY BUTTON B | USE OF SAVED FILE: TRANSMIT | COLOR: AUTOMATIC | SHEET SIZE: A4 | | /folder/bbb | DOCUMENT A | 001 |
| | | | | | | DOCUMENT B | 002 |
| | | | | | | DOCUMENT C | 003 |

IMAGE PROCESSING APPARATUS, CONTROL METHOD TO EXECUTE PLURALITY OF FUNCTIONS FOR AN IMAGE PROCESSING APPARATUS, AND STORAGE MEDIUM

BACKGROUND OF THE INVENTION

Field of the Invention

The present invention relates to an image processing apparatus that executes processing on a selected file, a control method for the image processing apparatus, and a program.

Description of the Related Art

In a case where an image processing apparatus, such as a multifunction peripheral (MFP), executes processing, such as printing, setting contents, including a sheet size, the number of copies, and monochrome printing are input to the image processing apparatus. To save time and labor for inputting the setting contents every time processing is executed, Japanese Patent Application Laid-Open No. 2015-22651 discusses a document management system in which an operation history is displayed on a timeline (timeline for history) as an item. The timeline for history is incorporated into an existing screen of a display operation panel to be displayed. When each item on the timeline for history (the item is hereinafter referred to as a history button) is pressed, a setting screen corresponding to an operation history is displayed. When an execution button on the setting screen is pressed, processing is executed based on the operation history selected on the timeline for history.

Recent image processing apparatuses include not only a paper media printing function and a scan function, but also a "use of saved file" function for saving a file on a storage area, which is located within or outside the apparatus, and for printing the saved file or transmitting the saved file to an external server.

SUMMARY OF THE INVENTION

According to an aspect of the present invention, there is provided an image processing apparatus configured to display a list of files stored in one of an external server and the image processing apparatus and includes an application for selecting a plurality of files from the displayed list of files and for printing the plurality of selected files or transmitting the plurality of selected files to a transmission destination by the image processing apparatus, the image processing apparatus including a display unit configured to arrange and display a software key generated upon selection of the application to execute a job, the software key being used to instruct re-execution of the application on the plurality of files based on setting contents of the executed job, and an identifying unit configured to identify the plurality of files associated with the software key. In a case where the plurality of files identified by the identifying unit includes a missing file, the application is executed on an existing file included in the plurality of files identified by the identifying unit.

Further features of the present invention will become apparent from the following description of exemplary embodiments with reference to the attached drawings.

BRIEF DESCRIPTION OF THE DRAWINGS

FIG. 18 illustrates a table of an example of record information according to the exemplary embodiment of the present invention.

DESCRIPTION OF THE EMBODIMENTS

A configuration in which a history of executing a "use of saved file" function is displayed using the above-described history button can be employed. When such a configuration is employed on a timeline on which items are displayed in a chronological order, history buttons for executing the "use of saved file" function are displayed in the chronological order of the execution history. This leads to an improvement in user operability. However, this configuration has the following issue.

That is, even in a state where some of a plurality of files cannot be identified due to, for example, deletion of the files, some history buttons for executing the "use of saved file" function on a plurality of files can be left on the timeline. In this case, there is a possibility that the history button may be pressed by a user. However, if the processing corresponding to the history buttons is cancelled due to some unidentified files, the user operability deteriorates.

Accordingly, the present invention is directed to enabling execution of the "use of saved file" function on some of the remaining files even when some of the files cannot be identified in the case of executing the "use of saved file" function using the history button.

Exemplary embodiments of the present invention will be described below with reference to the accompanying drawings. The following exemplary embodiments are merely examples and are not intended to limit the present invention.

<Definition of User Operations>

User operations according to a first exemplary embodiment will be described.

Touch (or touch operation): A general touch operation of touching a touch display with a finger.

Release (or release operation): An operation to release the finger that is in contact with the touch display.

Tap (or tap operation): An operation to bring a finger into contact with the touch display and then release the finger.

Long tap (or long tap operation): An operation to maintain a state where a finger is in contact with the touch display for a certain period of time. The period in which the finger is in contact with the touch display during a long tap operation is longer than the period in which the finger is in contact with the touch display during a tap operation.

Flick (or flick operation): An operation to move a finger in any direction on the touch display so as to flip the surface of the touch display with the finger.

Drag (or drag operation): An operation to move a finger without executing a release operation from a state where a specific object is selected by a long tap operation.

<System Configuration>

Figure 1:
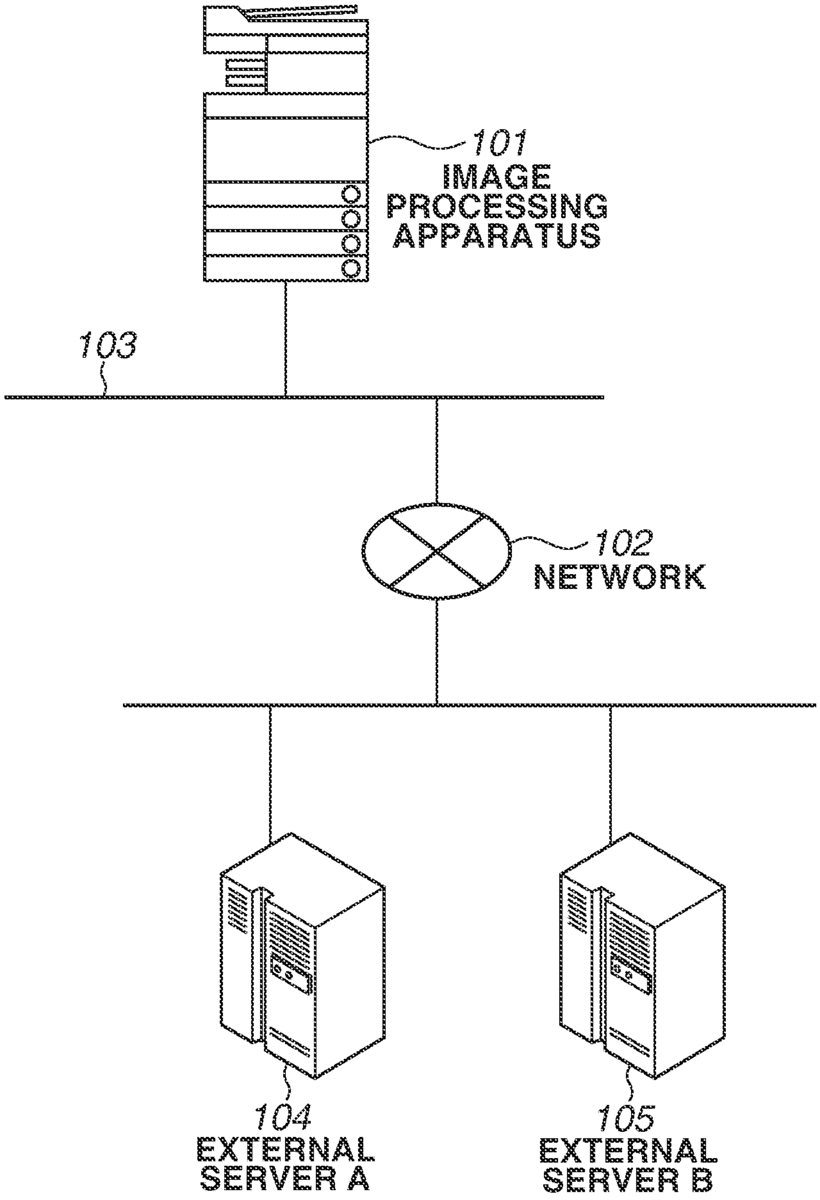
FIG. 1 illustrates a configuration of a system according to an exemplary embodiment of the present invention.

FIG. 1 illustrates an overall configuration of a system including an image processing apparatus 101, an external server A 104, and an external server B 105 according to the present exemplary embodiment. In this system, the image processing apparatus 101, the external server A 104, and the external server B 105 are connected via networks including a network 102 and a local area network (LAN) 103. The image processing apparatus 101 is a multifunction peripheral (MFP) including at least a scan function and a copy function.

The external server A 104 including a file management function is connected to the network 102 via the LAN 103. The configuration of the external server B 105 is similar to the configuration of the external server A 104. Alternatively, each of the external server A 104 and the external server B 105 may be configured using a plurality of servers and may be configured to activate a plurality of virtual machines among the servers to perform distribution processing. In this case, a technique (cloud computing) for increasing the number of virtual machines in accordance with a predetermined condition is used. The technique is called "scale out".

<Hardware Configuration of Image Processing Apparatus>

Figure 2:
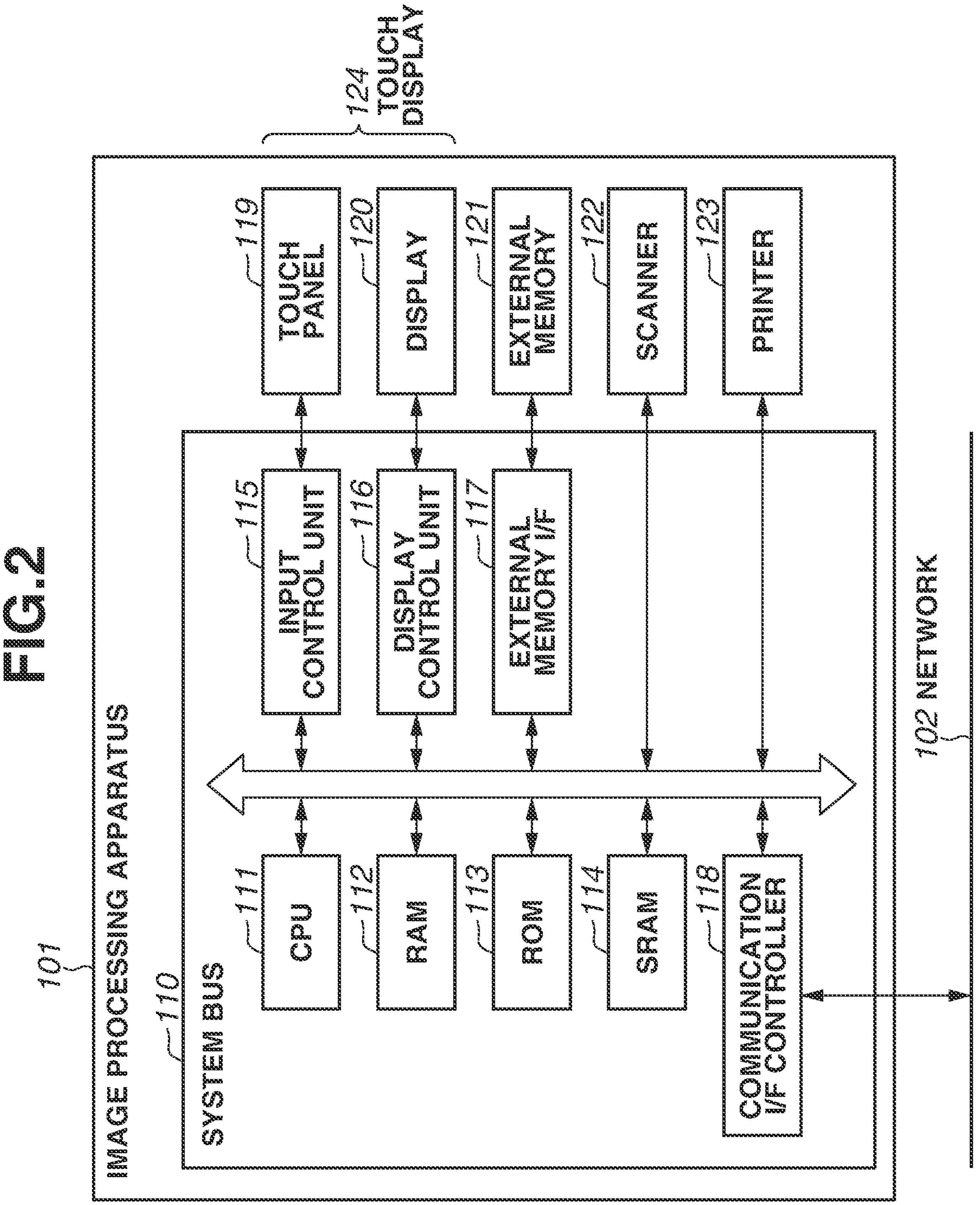
FIG. 2 illustrates a hardware configuration of an image processing apparatus according to the exemplary embodiment of the present invention.

FIG. 2 illustrates a hardware configuration of the image processing apparatus 101.

A central processing unit (CPU) 111, a random access memory (RAM) 112, a read-only memory (ROM) 113, a static RAM (SRAM) 114, an input control unit 115, a display control unit 116, an external memory interface (I/F) 117, and a communication I/F controller 118, which are included in the image processing apparatus 101, are connected to each other via a system bus 110. A touch panel 119, a display 120, an external memory 121, a scanner 122, and a printer 123 are also connected to the system bus 110. Each processing unit included in the image processing apparatus 101 is configured to exchange data via the system bus 110.

The ROM 113 is a non-volatile memory and stores image data, other pieces of data, various programs for causing the CPU 111 to operate, and the like in predetermined areas. The RAM 112 is a volatile memory and is used as a temporary storage area such as a main memory or a work area for the CPU 111.

The CPU 111 controls each unit of the image processing apparatus 101 based on, for example, programs stored in the ROM 113 by using the RAM 112 as a work memory. The program for causing the CPU 111 to operate can be stored not only in the ROM 113, but also in the external memory (such as a hard disk) 121. The SRAM 114 is a non-volatile recording medium capable of performing a high-speed operation.

The input control unit 115 receives a user operation, generates a control signal, and supplies the generated control signal to the CPU 111. For example, the input control unit 115 receives a user operation from a keyboard (not illustrated), a mouse (not illustrated), or the touch panel 119, which function as an input device. The touch panel 119 is, for example, an input device configured to output coordinate information corresponding to a position at which a touch operation is performed on the input control unit 115 which is constructed in a planar or elevational manner. Assume that the touch panel 119 according to the present exemplary embodiment is a display unit (touch display 124) that is integral with the display 120 to be described below.

The CPU 111 controls each processing unit of the image processing apparatus 101 based on the control signal, which is generated and supplied by the input control unit 115 in response to a user operation performed on the input device, according to programs. This enables the image processing apparatus 101 to perform the operation corresponding to the user operation.

The display control unit 116 outputs, to the display 120, a display signal for causing the display 120 to display an image. For example, the CPU 111 supplies a display control signal generated according to a program to the display control unit 116. The display control unit 116 generates a display signal based on the display control signal and outputs the generated display signal to the display 120. For example, the display control unit 116 causes the display 120 to display a graphical user interface (GUI) screen constituting a GUI based on the display control signal generated by the CPU 111.

In the present exemplary embodiment, the touch panel 119 is integrally formed with the display 120, and also functions as an operation unit. For example, a manufacturer constructs the touch panel 119 so as to have a light transmittance that does not hinder a display performance of the display 120, and attaches the touch panel 119 to an upper layer of a display surface of the display 120. Then, the manufacturer associates input coordinates on the touch panel 119 with display coordinates on the display 120. This configures the GUI which allows the user to directly perform an operation on a screen displayed on the display 120. The touch panel 119 and the display 120 being integrated will be hereinafter referred to as the touch display 124.

The external memory I/F 117 is an interface used to mount the external memory 121, such as a hard disk, a floppy disk, a compact disc (CD), a digital versatile disc (DVD), or a memory card. The external memory I/F 117 reads data from the mounted external memory 121 and writes data into the external memory 121 based on a control operation of the CPU 111. The communication I/F controller 118 is used to perform communication with various networks 102, such as a LAN, the Internet, a wired network, and a wireless network, based on a control operation of the CPU 111. Various apparatuses, such as a personal computer (PC), another MFP, a printer, and a server, are connected to the network 102 in such a manner that the various apparatuses can communicate with the image processing apparatus 101.

The scanner 122 scans a document and generates image data. The printer 123 executes print processing based on a user instruction input via the input control unit 115, or a command input from an external apparatus via the communication I/F controller 118. The CPU 111 functions as an identifying unit, and is capable of identifying, for example, the following gesture operation and state on the touch panel 119.

The touch panel 119 can be a touch panel of any type selected from various types of touch panels, including a resistance film type, a capacitance type, a surface acoustic wave type, an infrared type, an electromagnetic induction type, an image recognition type, and an optical sensor type.

The image processing apparatus 101 can store image data in the RAM 112 or the external memory 121 by at least one storage method. For example, the image processing apparatus 101 stores image data generated based on the document scanned by the scanner 122. Further, the image processing apparatus 101 stores image data received from an external apparatus, such as a PC, which is connected to the network 102 via the communication I/F controller 118. Furthermore, the image processing apparatus 101 stores image data received from a portable storage medium (a universal serial bus (USB) memory, a memory card, or the like) mounted on the external memory I/F 117. In addition, the image processing apparatus 101 may store image data in the external memory 121 by another storage method. The image data to be stored can be data obtained by reflecting various setting contents, including print setting contents, in the document scanned by the scanner 122. The image data to be displayed on the display 120 may include character information, or image information such as a picture and a graphic image. The image data may include both character information and image information and other information. Furthermore, the image data can be a sample image previously stored internally.

<Software Configuration of Image Processing Apparatus>

Figure 3:
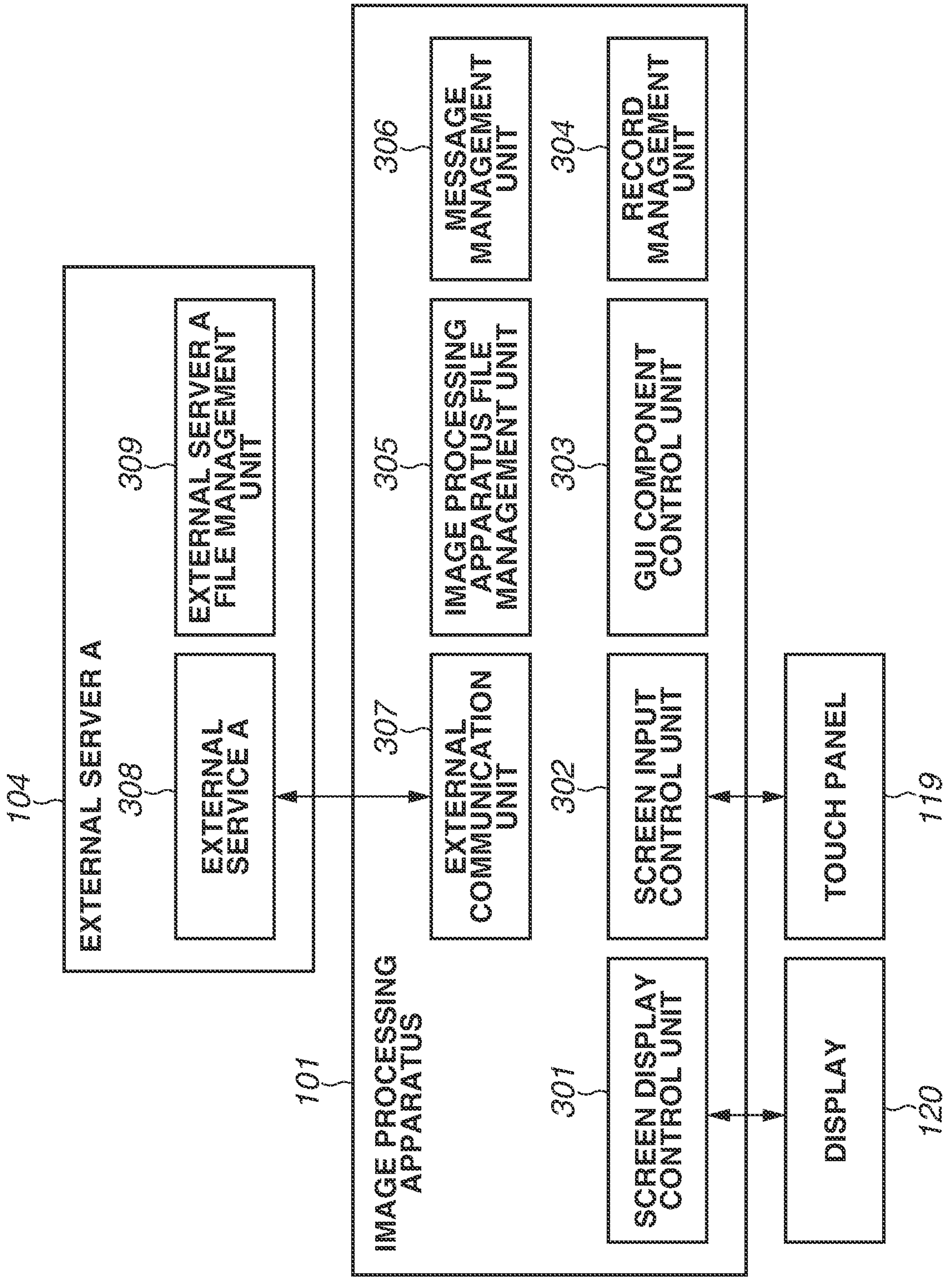
FIG. 3 illustrates a software configuration of the image processing apparatus according to the exemplary embodiment of the present invention.

FIG. 3 illustrates a software configuration of the image processing apparatus 101. For convenience of explanation, the software configuration of the external server A 104 and the image processing apparatus 101 will be described below. However, the software configuration of the external server B 105 is also similar to the software configuration of the external server A 104. In the present exemplary embodiment, unless otherwise noted, data exchange between software modules illustrated in FIG. 3 is performed in such a manner that the CPU 111 controls the RAM 112, the ROM 113, the input control unit 115, and the display control unit 116 via the system bus 110. A screen display control unit 301 of the image processing apparatus 101 mainly performs processing of managing applications, processing of transferring information about a screen to the display 120, and processing of notifying applications of an event input from the touch panel 119.

A screen input control unit 302 converts a signal, which is converted from an operation input from the touch panel 119 by the input control unit 115, into a format of an event that can be transmitted to an application. Then, the screen input control unit 302 notifies a GUI component control unit 303 of the event.

The GUI component control unit 303 analyzes the event received from the screen input control unit 302, and the CPU 111 determines the configuration of the GUI component control unit 303 and instructs the screen display control unit 301 to perform a display operation.

A record management unit 304 can preliminarily store record information corresponding to a history button. The record information differs from application to application. In the case of the "use of saved file" function, the record information is information about setting contents and a selected file, or information about a file path or the like of a selected file.

An image processing apparatus file management unit 305 receives an input from the GUI component control unit 303 and manages files stored in the image processing apparatus 101. Each file managed by the image processing apparatus file management unit 305 is deleted after an expiration date of the file, or is deleted by a user operation via the screen display control unit 301.

A message management unit 306 manages a message to be displayed on the screen display control unit 301.

An external communication unit 307 communicates with the external server A 104 so as to use an external server A file management unit 309 of the external server A 104.

An external service A 308 of the external server A 104 receives a request from the external communication unit 307, and transmits a response for providing services offered by the external service A 308 to the external communication unit 307 of the image processing apparatus 101.

The external server A file management unit 309 manages files stored in the external server A 104. Further, the external server A file management unit 309 deletes files or folders by a user operation, or deletes files or folders after an expiration date of the corresponding file or folder.

<Home Screen 401>

A home screen 401 to be displayed on the display 120 will be described with reference to FIG. 4. Unless otherwise noted, the home screen 401 according to the present exemplary embodiment is displayed by the screen display control unit 301.

The home screen 401 includes a main area 402 on which a software key for executing various functions included in the image processing apparatus 101 is displayed, and a timeline 404 on which history buttons are displayed. The main area 402 enables switching to another main area 402 by a flick operation in a horizontal direction. The timeline 404 enables switching of history buttons that are not displayed in FIG. 4 into a display state by a flick operation in a vertical direction. However, the method of switching screens in each area is not particularly limited. For example, history buttons that have not been displayed may be displayed by a horizontal flick operation on the timeline 404, or the display screen may be switched to another display screen. The user operations that can be detected on each screen are not limited to the user operations illustrated in the present exemplary embodiment, but instead may be a flick operation and a drag operation.

A copy button 406, which is an example of software keys, is a software key for calling a copy application. When a touch operation performed by a user operation is detected by the input control unit 115, the display control unit 116 causes the home screen 401 to transition to a copy setting screen (FIG. 8B). Default setting contents are reflected in the setting screen displayed when the copy button 406 is pressed. On the copy setting screen, execution conditions (such as the number of copies, color designation, and a sheet size) for executing the copy application can be set.

A copy shared button 408 and a My transmission button 409 are software keys that are created by a user (for example, a user 1) which has logged in to the image processing apparatus 101, or by an administrator of the image processing apparatus 101. A creator who creates a customize button determines whether to constantly display the customize button on the home screen 401. For example, the copy shared button 408 is a custom button created by the administrator of the image processing apparatus 101, and is constantly displayed on the home screen 401. On the other hand, the My transmission button 409 is a custom button created by the user (user 1) who has logged in to the image processing apparatus 101. When the log-in user is switched to another user, the My transmission button 409 is not displayed.

When the copy shared button 408 is pressed, document data can be copied by 2-in-1 and double-sided printing. When the My transmission button 409 is pressed, the document data can be transmitted in portable document format (PDF) format at 300 dpi. As an operation to be performed after the copy shared button 408 or the My transmission button 409 is pressed, the setting screen (for example, see FIG. 8B) may be displayed, or processing corresponding to the copy shared button 408 or the My transmission button 409 may be executed without displaying the setting screen. The processing to be performed after various buttons 408 and 409 are pressed may be differentiated by a method of registering various buttons (for example, registration on the home screen 401 from a history button, or registration on the home screen 401 from the setting screen).

Figure 4:
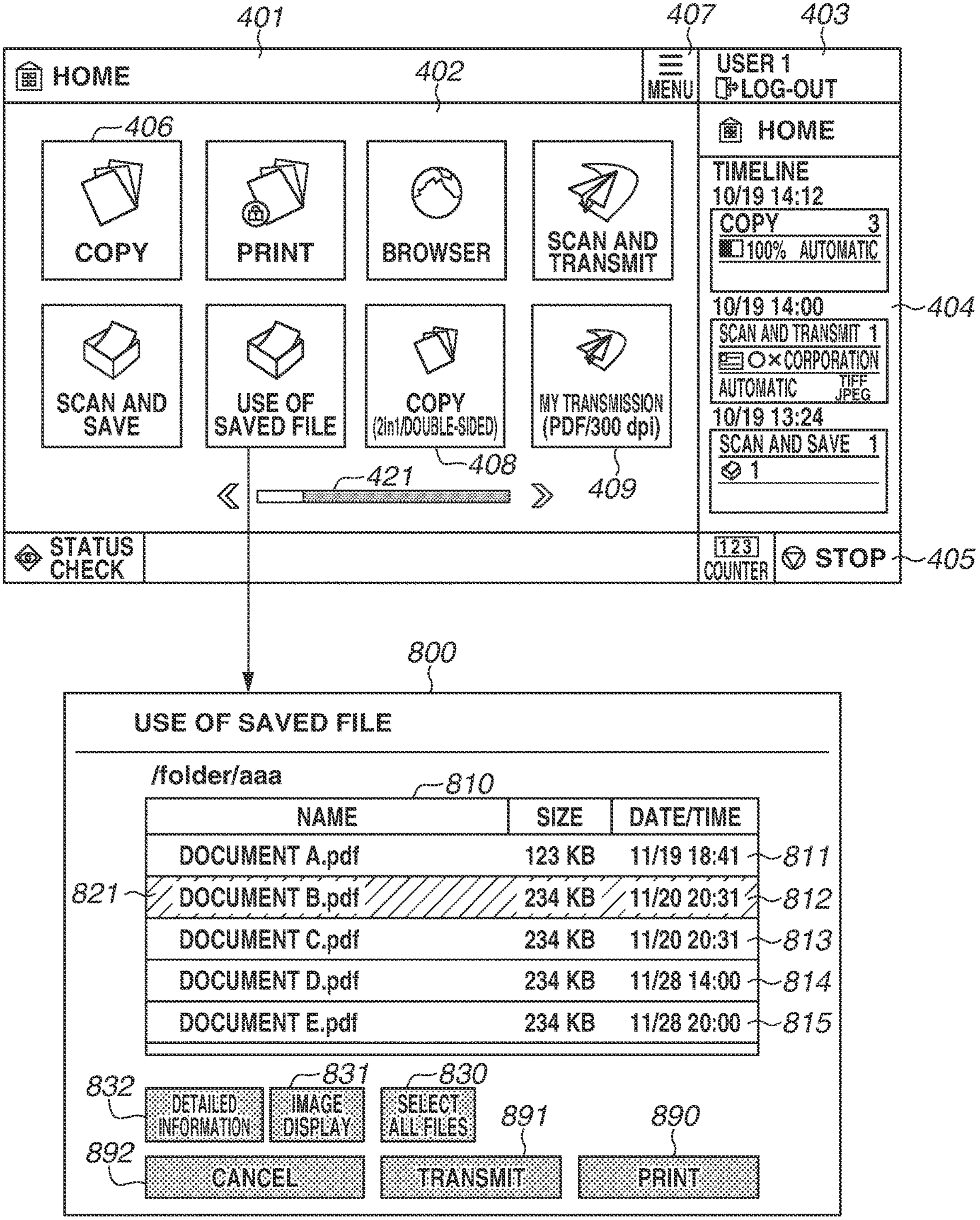
FIG. 4 illustrates an example of a home screen and a list screen according to the exemplary embodiment of the present invention.

While FIG. 4 illustrates eight software keys, software keys that cannot be displayed within the main area 402 are displayed on another main area 402 (not illustrated). The other main area 402 is switched and displayed by a horizontal flick operation on the main area 402, or by a switch bar 421.

A setting menu 407 is a menu from which the background of the home screen 401, the size of each software key, the number of software keys that can be displayed, and the like can be changed.

A right portion of the home screen 401 includes an upper software key area 403, the timeline 404, and a lower software key area 405. The upper software key area 403 and the lower software key area 405 are areas on which keys that are constantly displayed and can be executed are arranged. On the upper software key area 403 according to the present exemplary embodiment, a home button for returning to the home screen 401 and a log-out button for enabling the user who has logged in to the image processing apparatus 101 to log out are displayed. On the lower software key area 405, a stop button for cancelling processing performed by an application, and a counter indicating the number of sheets used in print processing are displayed. The right portion of the home screen 401 may be constantly displayed. Alternatively, display or non-display of the right portion of the home screen 401 may be switched by the screen being displayed on the display 120.

The timeline 404 is an area for displaying each history button generated when the processing corresponding to the software keys on the main area 402 is executed. History buttons indicating the same processing contents (same document data and same setting content) are not displayed in an overlapping manner on the timeline 404. Specifically, when processing that is not present on the timeline 404 is executed, the history button corresponding to the processing is added to the timeline 404 for the first time as a list. When processing that is present on the timeline 404 is executed, the date and time when the history button corresponding to the processing is executed are updated. The order of history buttons on the timeline 404 may be changed based on the execution date and time. History buttons may be added in ascending order of date and time when processing is executed. The order of history buttons to be added according to the present exemplary embodiment is not particularly limited.

When a history button is pressed, processing corresponding to the history button can be re-executed based on the contents of the processing previously executed. In the present exemplary embodiment, "copy", "scan and transmit", and "scan and save" are displayed as history buttons corresponding to the processing previously executed. The number of history buttons that can be displayed on the timeline 404 is not particularly limited.

<History Buttons>

Figure 17:
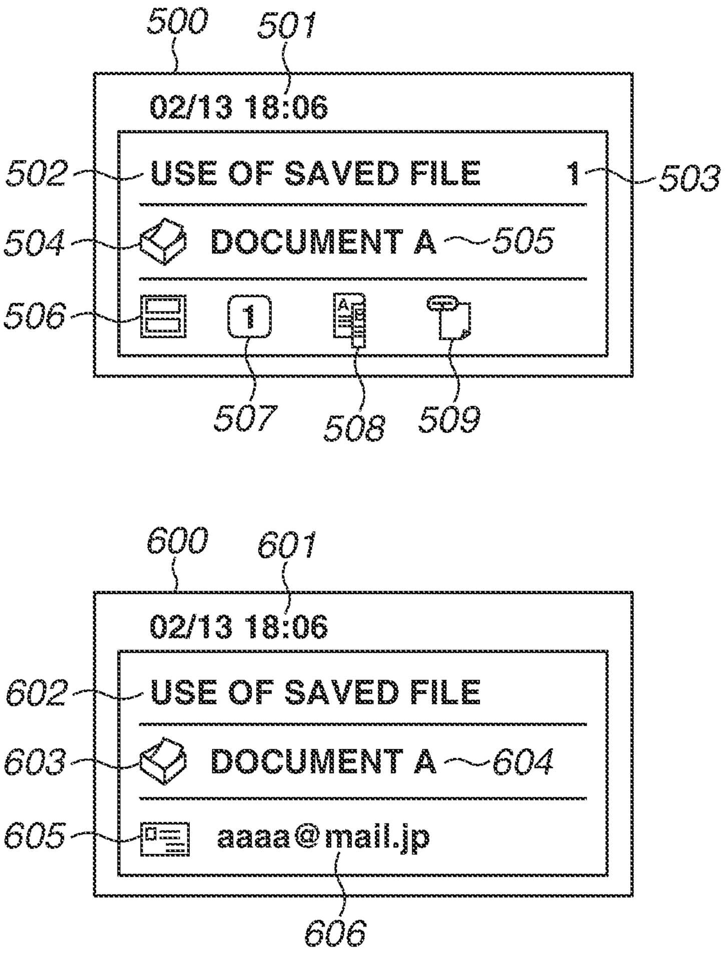
FIG. 17 illustrates an example of the history button according to the exemplary embodiment of the present invention.

FIG. 17 illustrates an example of history buttons to be displayed on the timeline 404. A button 500 is an example of history buttons created when a print function in the "use of saved file" function is executed. A display area 501 displays the date and time of when a job is executed (date and time when the history button is created, or date and time when the history button is updated). A display area 502 displays a function name. A display area 503 displays the number of copies when a saved file is printed. A display area 504 displays a job history function as an icon. A display area 505 displays a file which is a job execution target and is selected by the user from a list of files displayed when the "use of saved file" button on the home screen 401 is pressed.

Also, in a case where the button 500 corresponds to the history button for printing a plurality of files, the file name to be displayed on the button 500 is limited to a file name of a representative file or files names of some files. For example, assume that the file name of a first printed file is displayed on the button 500. A display area 506 is an icon indicating either color or monochrome. A display area 507 indicates a set sheet feed stage. A display area 508 indicates double-sided printing. A display area 509 indicates designation of stapling. Print settings also include, for example, bookbinding. However, such print settings are not displayed on the button 500. Thus, the pieces of information, such as the print settings and the file name (display area 505), which are displayed on each history button, are limited. This is because the area for displaying the history buttons on the home screen 401 is limited.

A button 600 is an example of history buttons created when a transmission function in the "use of saved file" function is executed. Display areas 601 and 602 and display areas 603 and 604 are similar to the display areas 501 and 502 and the display areas 504 and 505, respectively. A display area 605 is an icon indicating that the file (document A in this case) is transmitted by mail. A display area 606 indicates a mail address as a transmission destination used for transmission of the file. Even when a plurality of addresses is set, only one representative address is displayed on the history button. When the transmission destination of the file is a specific folder in the external server A, the file path of the file is described in the display area 606.

<List Screen>

A list screen indicating files to be displayed as a result of pressing the "use of saved file" button on the home screen 401 will be described with reference to FIG. 4. A list screen 800 is an example of a screen on which a list of files stored in the record management unit 304 is displayed. A list 810 is an area on which the list of files is displayed. The list 810 is an example in which the name of a file stored in "/folder/aaa" (folder), the size of the file, and the date and time when the file is created are displayed in rows 811 to 815. In the list 810, other files stored in "/folder/aaa" can also be displayed by a flick operation.

Markers 820 to 823 represent numbers added in the order of selecting files. When a button 830 is pressed, all files stored in "/folder/aaa" are selected. A configuration in which a large number of files, such as 100 to 200 files, can be selected may be used. FIG. 4 illustrates that a color-inverted file (document B.pdf) in a row 821 is in a selected state and processing corresponding to each of a button 831 and a button 832 is to be executed on the file. When the button 831 is pressed, a preview of the file in the selected state (document B.pdf in the example illustrated in FIG. 4) is displayed. When the button 832 is pressed, detailed information about the file in the selected state is displayed. While the present exemplary embodiment illustrates a configuration in which both the button 830 and the button 831 are displayed on the list screen 800, a configuration in which only one of the buttons 830 and 831 is displayed may be employed.

When a button 890 is pressed, the screen transitions to a screen (for example, a setting screen 802) for printing the file in the selected state. A job may be immediately executed with default setting contents, without causing the screen to transition to the setting screen 802 after the button 890 is pressed.

When a print job is executed, the setting contents and the file for which the job is executed are held as record information. Then, a history button is created on the timeline 404 based on the record information.

When a button 891 is pressed, the screen transitions to a screen (not illustrated) for transmitting the selected file to a specific transmission destination such as a server. When a button 892 is pressed, the screen returns to the screen displayed before the transition to the list screen 800. For example, when the "use of saved file" button on the home screen 401 is pressed and the list screen 800 is displayed, the screen returns to the home screen 401. In this case, the selected state of the file on the list screen 800 is canceled.

<User Operation on Home Screen 401>

Figure 6A:
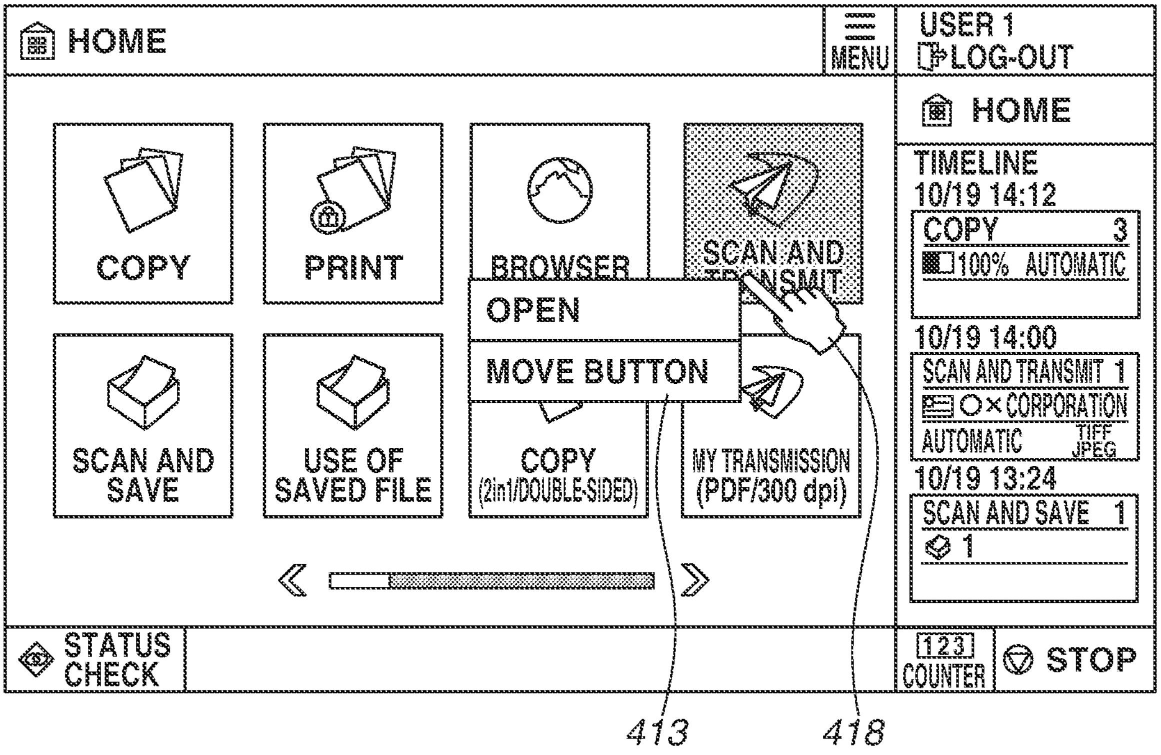
FIGS. 6A and 6B each illustrate an example of a state where an operation is performed on a display of the image processing apparatus according to the exemplary embodiment of the present invention.

FIG. 6A illustrates a state where a long tap operation 418 is executed on the software key "scan and transmit" displayed on the main area 402 and a context menu 413 is displayed. The positional relationship between the software key on which the long tap operation 418 is executed and the context menu 413 displayed as a result of executing the long tap operation is not limited to that illustrated in FIG. 6A. For example, the context menu 413 may be displayed in a lower right direction or an upward direction of the software key depending on a position where the long tap operation is performed on the software key.

Even when the user's finger used to execute the long tap operation is released in the state where the context menu 413 is displayed, the display state of the context menu 413 is maintained. When a function on the context menu 413 being displayed is selected from the state, the user's finger is released in the state where the context menu 413 on which the processing corresponding to the function is executed is displayed. Then, when the user touches an area other than the context menu 413 on the home screen 401, the context menu 413 which has been displayed disappears.

One of the conditions for determining that the user operation corresponds to the long tap operation 418 is a time during which the display 120 is pressed by the user operation. Assume that, in the present exemplary embodiment, the time is 500 msec. When the display 120 is pressed for 500 msec or longer, it is determined that the user operation corresponds to the long tap operation 418.

Figure 7A:
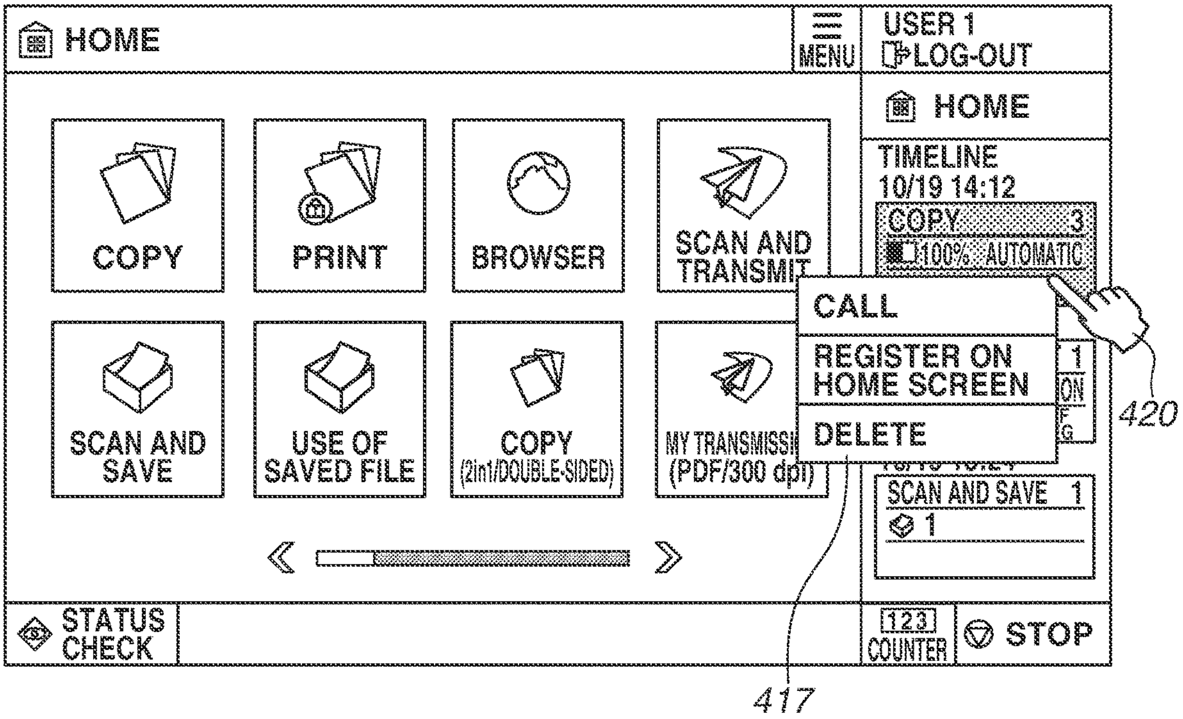
FIGS. 7A and 7B each illustrate an example of a state where an operation is performed on the display of the image processing apparatus according to the exemplary embodiment of the present invention.

FIG. 7A illustrates a state where a long tap operation 420 is executed on the history button "copy" on the timeline 404 and a context menu 417 is displayed. Like in the case of software keys, the position of each history button where the context menu 417 is displayed is not particularly limited. Assume that the time condition for determining that the user operation corresponds to the long tap operation 418 is 500 msec, like in the case of software keys.

Figure 6B:
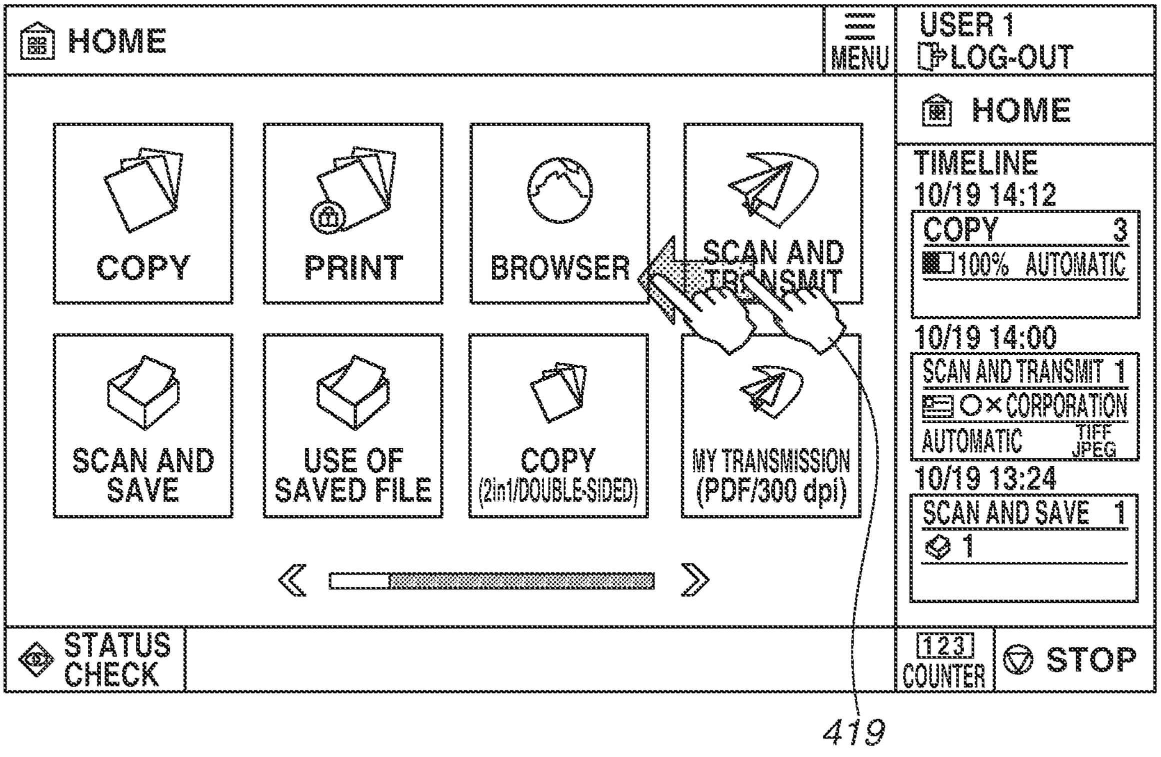

FIG. 6B illustrates a state where a drag operation in the horizontal direction (horizontal drag 419) is executed on the software key "scan and transmit". In this manner, when the operation position is moved before the condition for determining that the user operation corresponds to the long tap operation is satisfied, the context menu 413 is not displayed as a result of a button execution cancellation operation. The button execution cancellation operation refers to cancellation of execution of processing corresponding to a pressed software key when a movement distance from a position where the software key is touched to a position where the software key is released is greater than or equal to a predetermined number of pixels. The button execution cancellation operation is required so as to prevent a software key from being erroneously operated due to erroneous execution of a drag operation on the software key when the user executes the drag operation on the display 120 to switch the display to another main area 402.

Figure 7B:
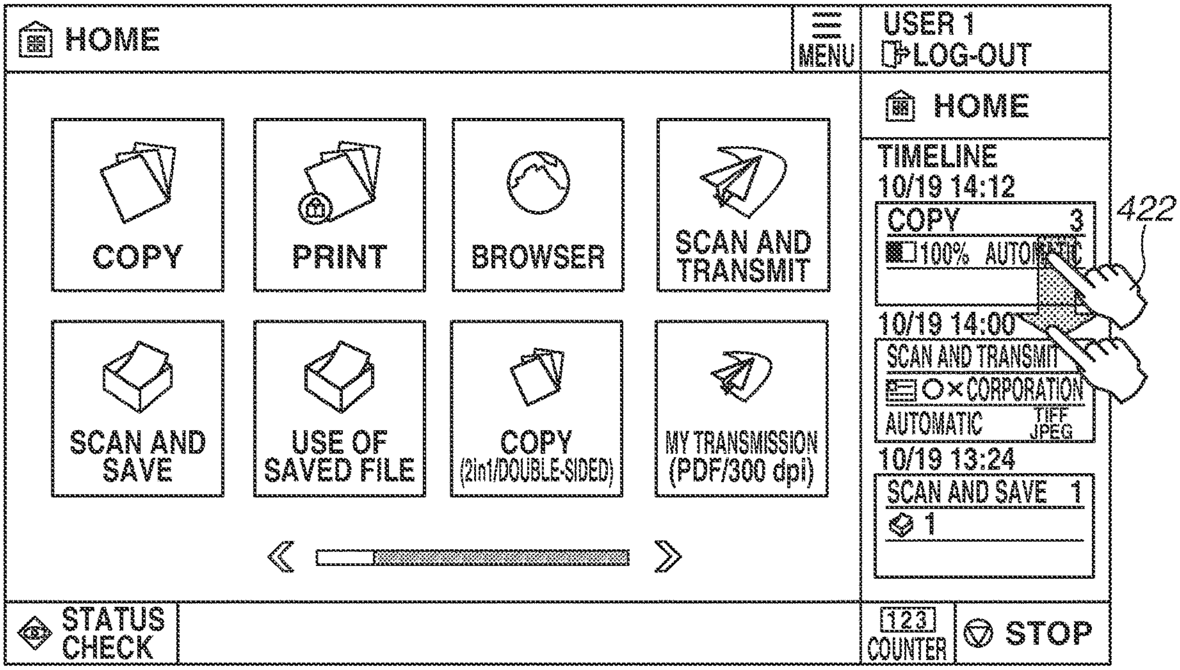

FIG. 7B illustrates a state where a drag operation in the vertical direction (vertical drag 422) is executed on the history button and the context menu 417 is not displayed as a result of a list execution cancellation operation. The list execution cancellation operation refers to cancellation of execution of processing corresponding to a pressed history button when a movement distance from a position where the software key is touched to a position where the software key is released. The list execution cancellation operation is required so as to prevent a history button from being erroneously operated due to erroneous execution of a drag operation on the history button when the user executes the drag operation on the display 120 to display the history button which is not displayed.

A threshold for the button execution cancellation operation on software keys is set to be greater than a threshold for the list execution cancellation operation on history buttons. For example, assume that the threshold for the button execution cancellation operation on software keys is 35 pixels and the threshold for the list execution cancellation operation on history buttons is 45 pixels. As described above, when different operation areas coexist on one home screen 401, the threshold for the execution cancellation operation may be changed for each operation area.

<Context Menu>

Figure 5:
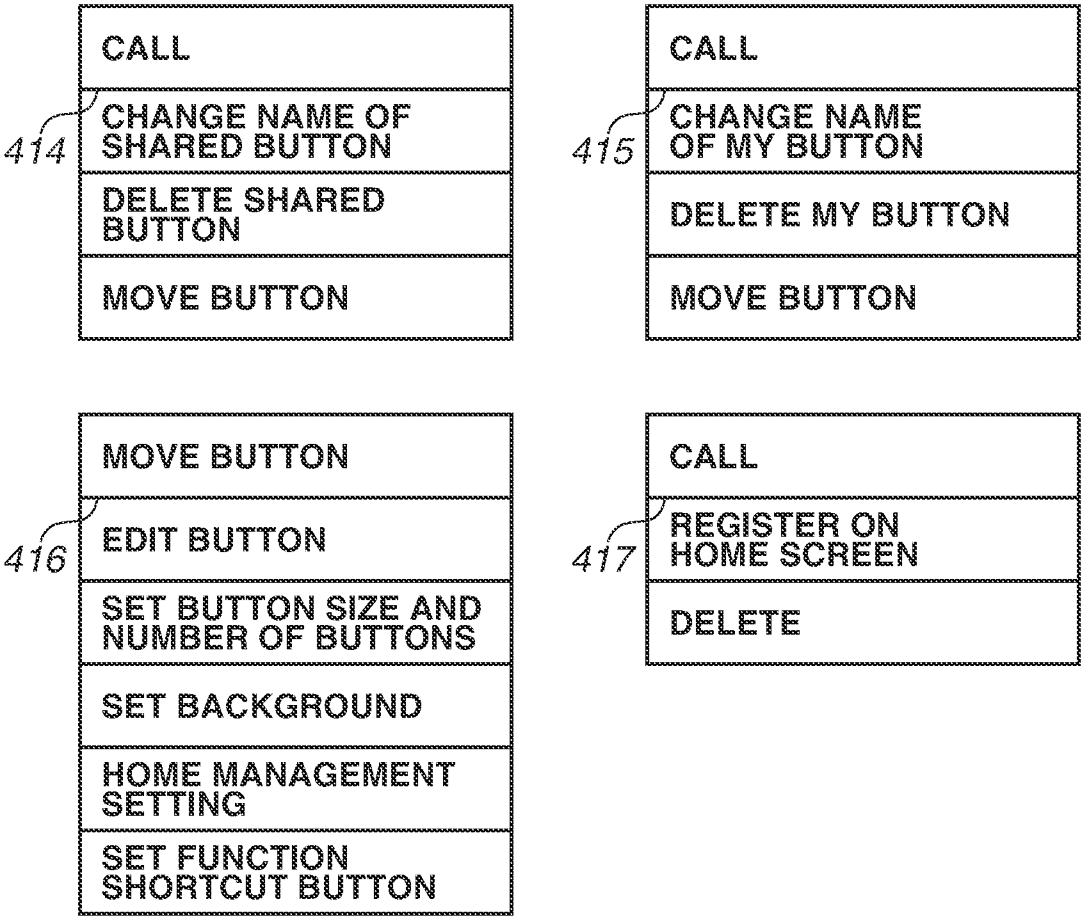
FIG. 5 illustrates an example of a context menu according to the exemplary embodiment of the present invention.

Context menus will be described with reference to FIG. 5, FIG. 6A, and FIG. 7A. A function corresponding to a software key on which a long tap operation is executed is displayed as an item on a context menu. An "open" function and a "move button" function are displayed on the context menu 413. When the "open" function is selected, a screen (not illustrated) for executing the processing corresponding to the software key on which the long tap operation is executed is displayed on the display 120. That is, selection of the "open" function on the context menu 413 is synonymous with pressing of the software key corresponding to the "open" function.

On the other hand, when the "move button" function on the context menu 413 is selected, all software keys displayed on the main area 402 are in a state of being movable by a user operation, and the software keys can be arranged at any position on the home screen 401.

Other context menus will be described with reference to FIG. 5. A context menu 414 is a context menu to be displayed when a long tap operation is executed on a shared button. The term "shared button" refers to a customize button created by the administrator. The shared button corresponds to the copy shared button 408 described above. The context menu 414 includes a "call" function for executing a software key, a "change name of shared button" function for changing the name of the shared button, a "delete shared button" function for deleting the shared button, and a "move button" function.

A context menu 415 is a context menu to be displayed when a long tap operation is executed on a My button. The term "My button" refers to a customize button created by the log-in user. The My button corresponds to the My transmission button 409 described above. The context menu 415 includes the "call" function, a "change name of My button" function for changing the name of the My button, a "delete My button" function for deleting the My button, and the "move button" function.

A context menu 416 is a context menu to be displayed when the setting menu 407 is pressed. The context menu 416 includes the "move button" function, an "edit button" function, a "set button size and number of buttons" function, a "set background" function, a "home management setting" function, and a "set function shortcut button" function.

When the "set button size and number of buttons" function is selected, the size and the number of the software keys displayed on the main area 402 can be changed. For example, the size of each of the buttons corresponding to the eight software keys displayed on the main area 402 may be increased so that only six software keys are displayed on the main area 402. The software keys that are not displayed in this case may be displayed on another main area 402 which is switched and displayed using the switch bar 421.

When the "set background" function is selected, the background of the main area 402 can be changed or set. When the "home management setting" function is selected, various management settings on the home screen 401 can be executed. For example, display or non-display of the timeline 404 can be set. The "set function shortcut button" function enables creation of a software key for executing processing desired by the user as a shortcut button on the main area 402.

The context menu 417 is a context menu to be displayed when a long tap operation is executed on the history button. The context menu 417 includes the "call" function, a "register on home screen" function, and a "delete" function. When the "register on home screen" function is selected, the button corresponding to the processing for the history button on which the long tap operation is executed is displayed on the main area 402. The My transmission button 409 is an example of the software key created by performing the long tap operation on the history button. The history buttons displayed on the timeline 404 are associated with the user who has logged in to the image processing apparatus 101. Accordingly, the history buttons and customize buttons created by pressing the "edit button" function on the context menu are displayed only when the user who has created the customize buttons has logged in to the image processing apparatus 101.

<History Button Execution Processing>

Figure 8A:
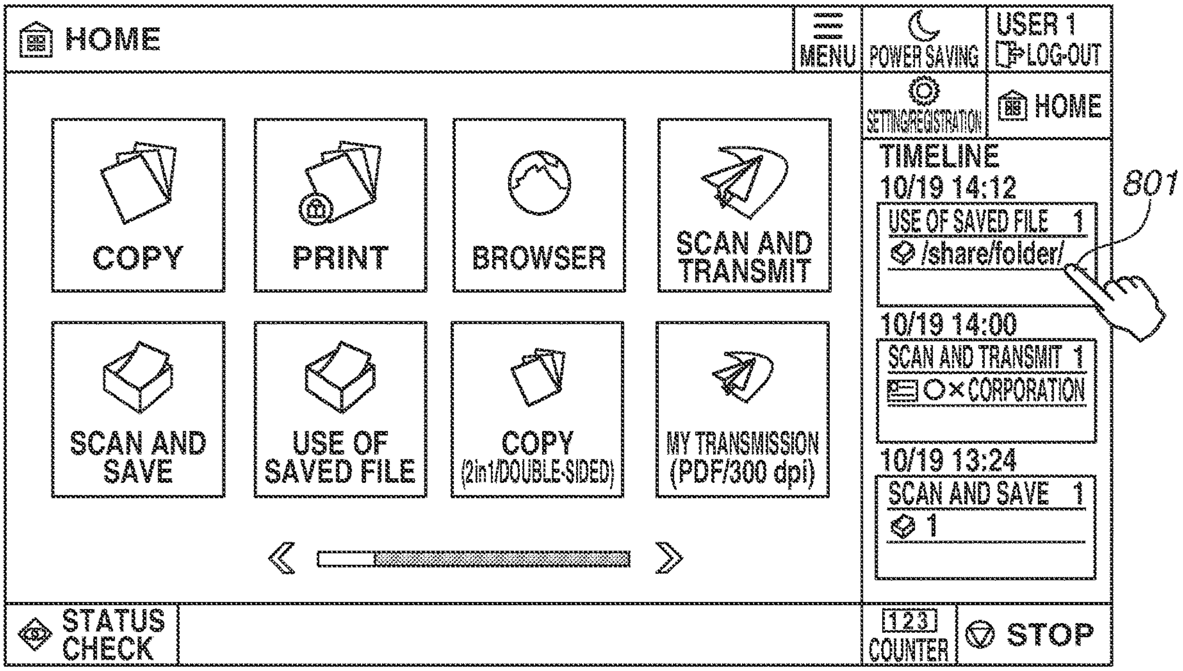
FIGS. 8A and 8B each illustrate an example of a screen transition of the image processing apparatus according to the exemplary embodiment of the present invention.
Figure 8B:
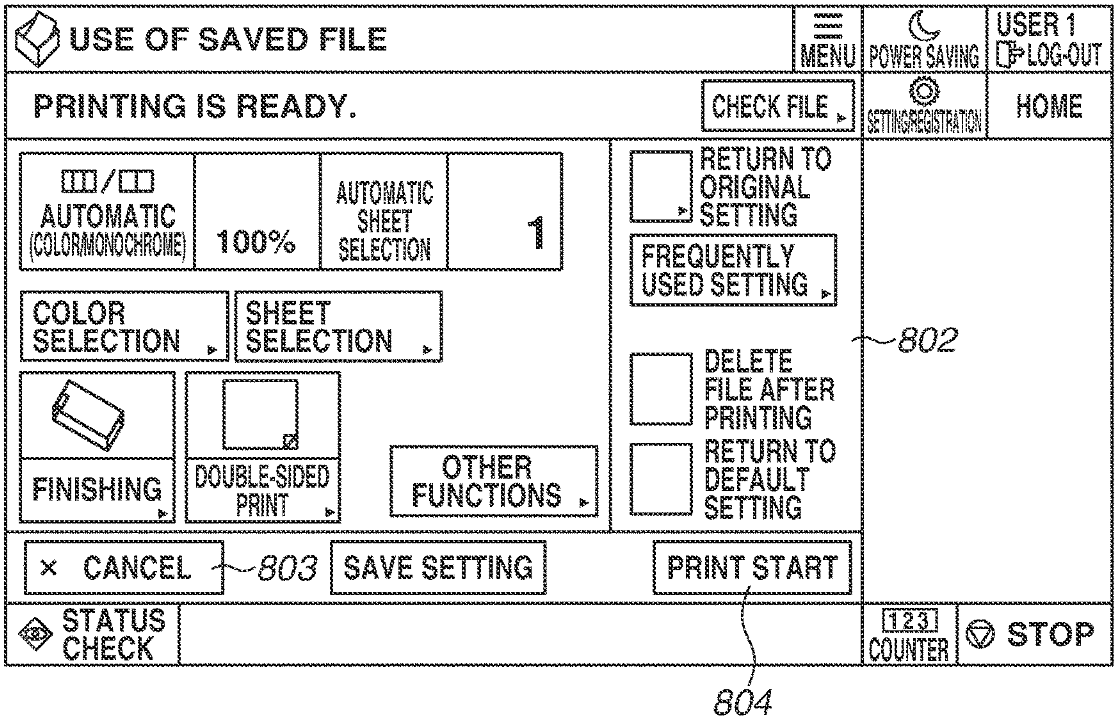

FIGS. 8A and 8B each illustrate a display operation of the display 120 of the image processing apparatus 101 according to an exemplary embodiment of the present invention.

FIG. 8A illustrates a screen example indicating the home screen 401 displayed on the display 120, and also illustrates a screen to be displayed when the user presses a history button 801. FIG. 8B illustrates a screen example indicating the setting screen 802 to be displayed on the display 120, and also illustrates a screen to which the screen transitions when the history button 801 for the saved file is pressed. The setting contents associated with the history button 801 are reflected in the setting screen 802. When a cancel button 803 is pressed, the screen transitions to a screen for reselecting a file in a state where the setting contents on the setting screen 802 are stored. In this case, the screen may transition to a screen for reselecting a file without storing the setting content. A print start button 804 is a button for executing print processing by using the selected file and the setting contents used at the time the history button 801 was registered.

While the present exemplary embodiment illustrates a configuration in which the setting screen 802 is displayed when a history button on the timeline 404 is pressed, a configuration in which predetermined processing is executed immediately when a history button is pressed without displaying the setting screen 802 may be employed.

<Error Screen>

An error screen to be displayed on the display 120 of the image processing apparatus 101 according to the exemplary embodiment of the present invention will be described with reference to FIGS. 9A to 9C.

Figure 9A:
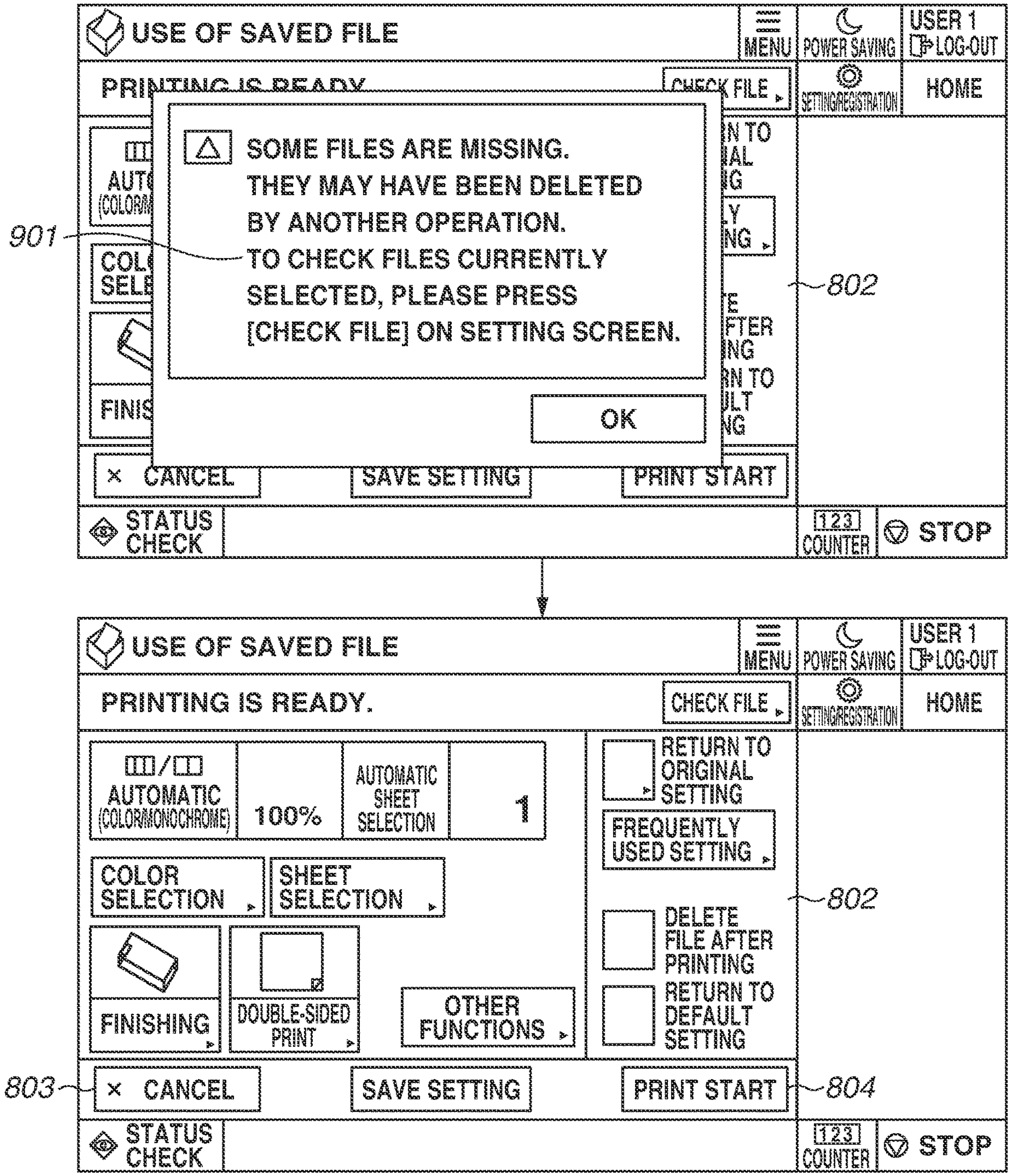
FIGS. 9A, 9B, and 9C each illustrate an example of the screen transition of the image processing apparatus according to the exemplary embodiment of the present invention.

FIG. 9A illustrates a transition from an error screen 901 to the setting screen 802. The error screen 901 is displayed in a case where some of a plurality of files associated with the history button 801 pressed by the user are not identified. A situation where some of the files are not identified is caused due to, for example, deletion of files after an expiration date of the files, or by a user operation, or movement of the files. A situation where the following files are not identified is caused due to the same causes described above. In the following exemplary embodiments, a situation where information (such as a document identification (ID) and a file name) about a file is searched from a selected history button and there are no files associated with the information is expressed as "the file is not identified".

When an OK button on the error screen 901 is pressed, the screen transitions to the setting screen 802. Thus, even when some of the files for which the job is executed are not identified, the screen transitions to the setting screen 802 allowing the user to make a print setting and execute printing for some identified files. Even when some of the files for which the job is executed are not identified, the setting contents of the setting screen 802 are the same as the setting contents displayed when all the files are identified.

A software key "check file" included in an error message on the error screen 901 will be described below in a fifth exemplary embodiment to be described below.

Figure 9B:
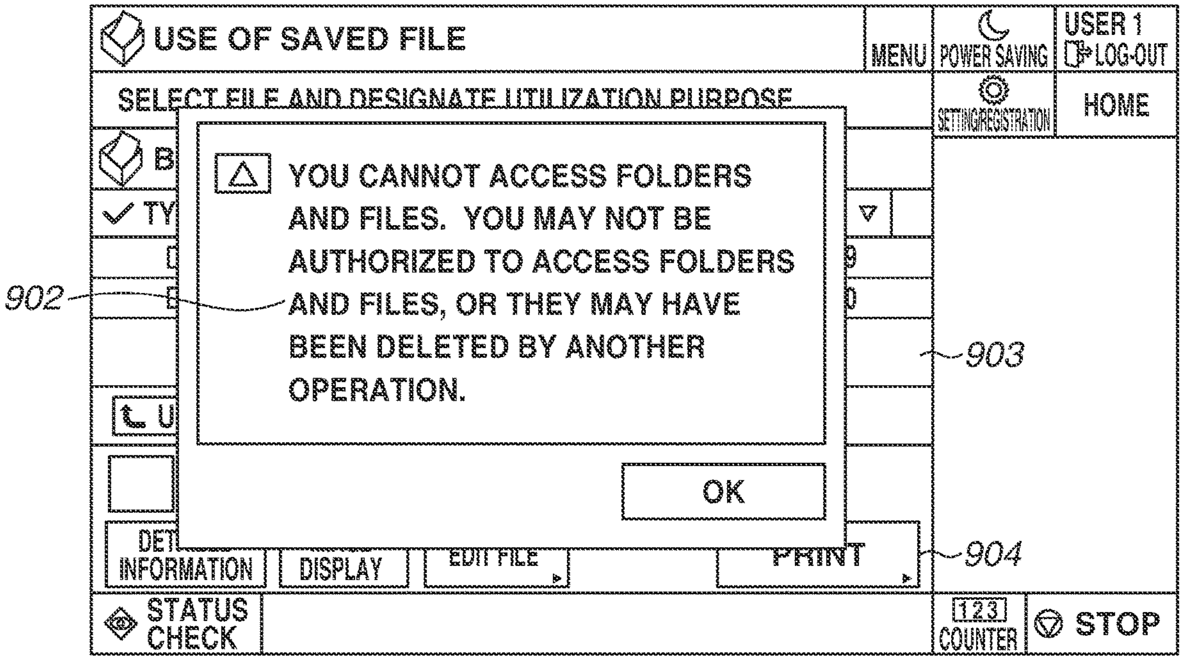

FIG. 9B illustrates a state where the screen transitions from an error screen 902 to a list screen 903. The error screen 902 is displayed in a case where the file associated with the history button 801 pressed by the user are not identified. If there is a plurality of files for which the job is executed, the error screen 902 is displayed in a case where not all the files are identified.

When an OK button on the error screen 902 is pressed, the error screen 902 disappears and the screen transitions to the list screen 903. As a file selection screen to be displayed in this case, the list screen 800 to be displayed when the "use of saved file" button on the home screen 401 is selected may be displayed.

Even when a file is reselected on the list screen 903, the setting contents are the same as the setting contents associated with the history button selected by the user. Although not described in the present exemplary embodiment, a configuration in which a print job setting associated with the history button is not reflected when the history button 801 is pressed to cause the screen to transition to the list screen 903 can also be employed.

Figure 9C:
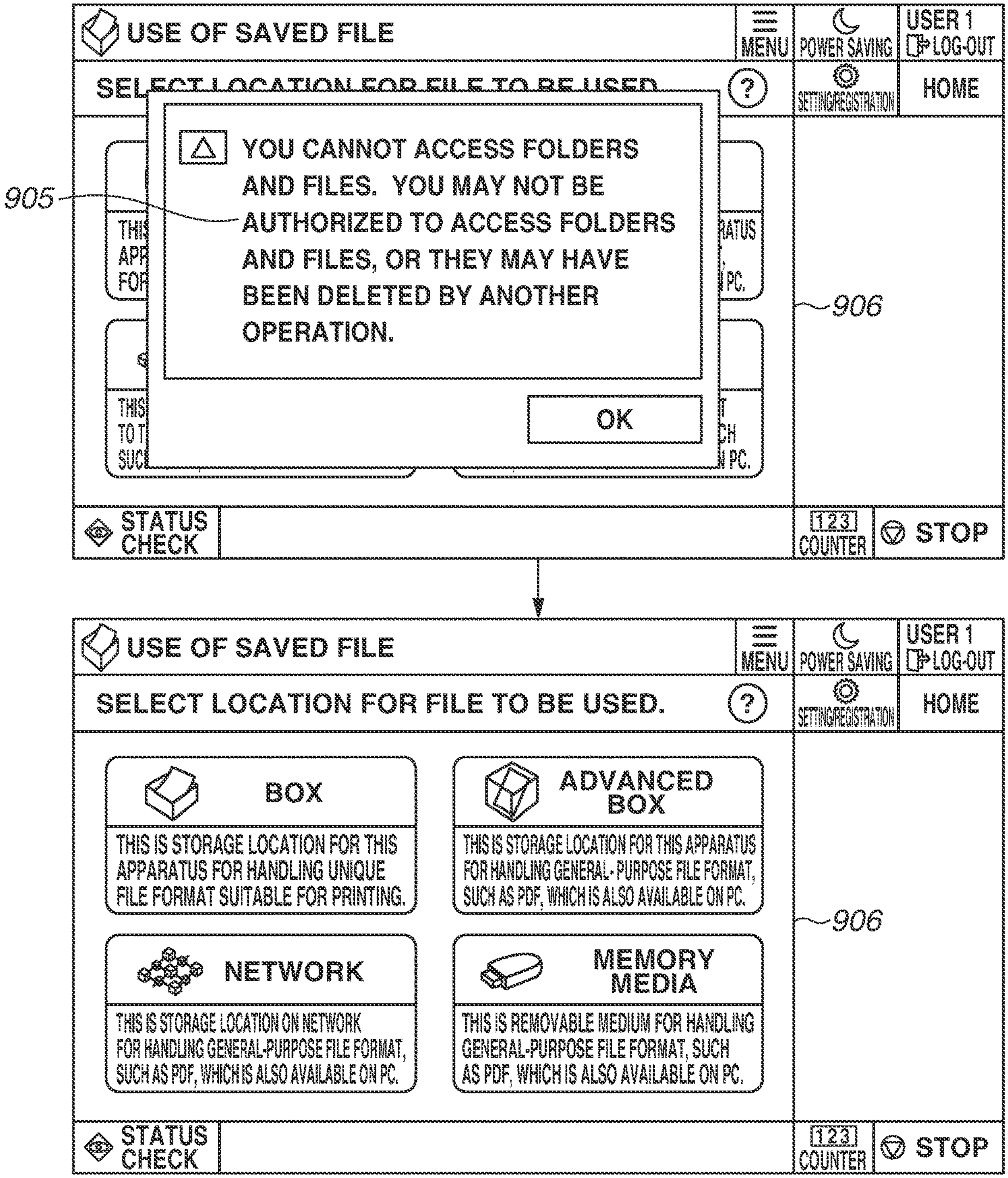

FIG. 9C illustrates a state where the screen transitions from an error screen 905 to an initial screen 906. The error screen 905 is displayed in a case where not all the files associated with the history button 801 are identified when the history button 801 is pressed, and further, the folder in which the files are stored is not identified. When the error screen 905 is displayed, the setting contents associated with the history button 801 are not stored.

Figure 10A:
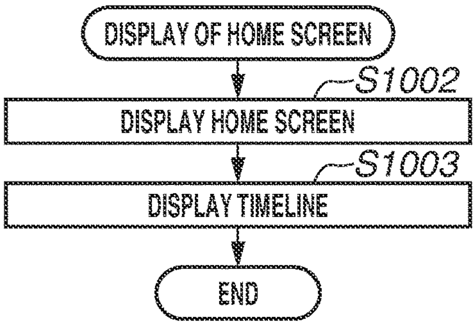
FIG. 10A illustrates a flow of processing for displaying the home screen according to the exemplary embodiment of the present invention.

FIG. 10A is a flowchart illustrating processing to be performed when the image processing apparatus 101 displays the home screen 401. Each step illustrated in FIG. 10A is implemented in such a manner that the CPU 111 executes programs preliminarily stored in the ROM 113 or the external memory 121. The processing illustrated in FIG. 10A is executed upon start-up of the image processing apparatus 101.

In step S1002, the screen display control unit 301 instructs the GUI component control unit 303 to generate a GUI component such as a software key.

In step S1003, the screen display control unit 301 instructs the GUI component control unit 303 to generate a GUI component such as a list required for displaying a timeline. In this case, record information (FIG. 18) to be described below is referenced.

Figure 10B:
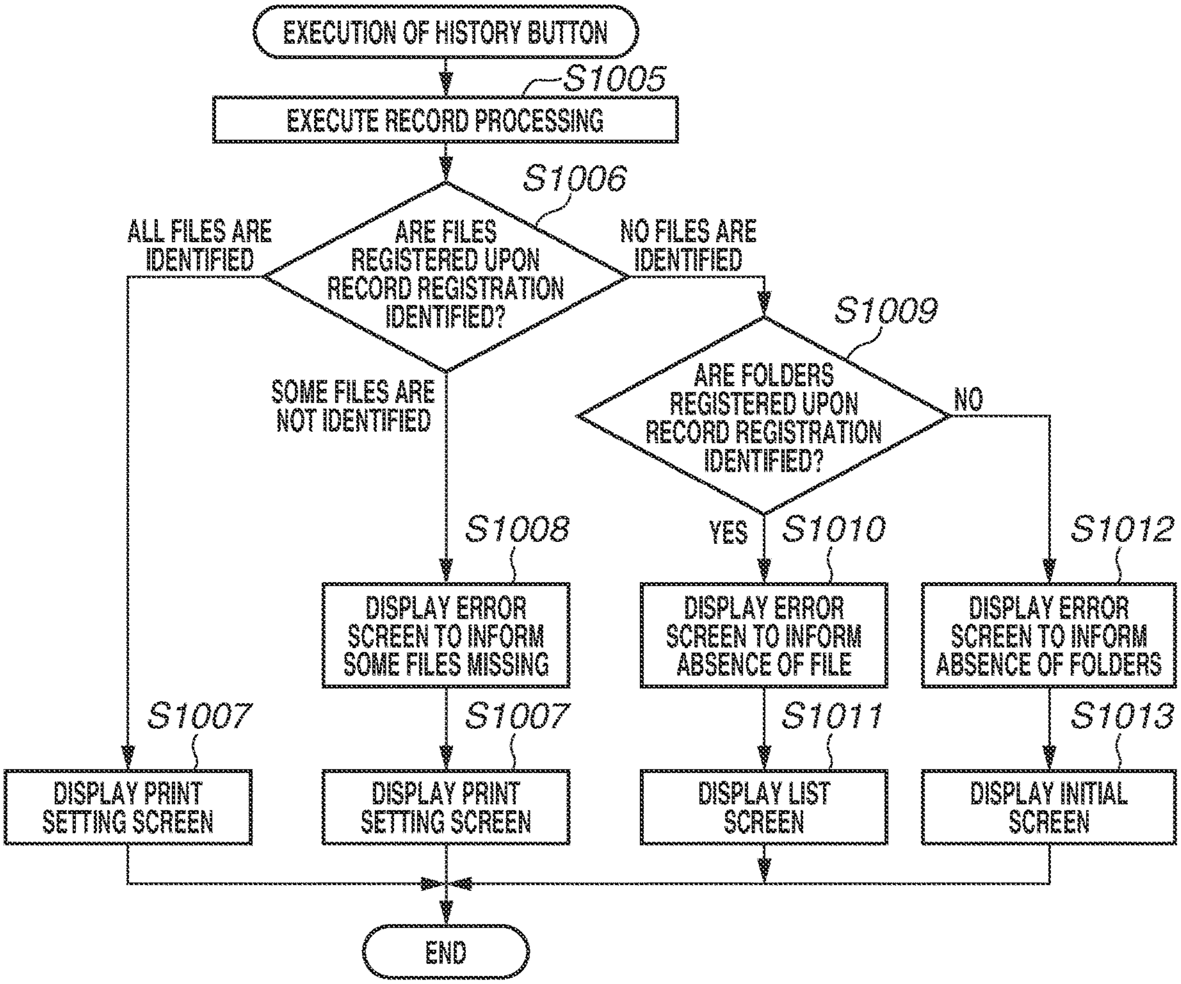
FIG. 10B illustrates a flow of processing to be performed after a history button is pressed according to the exemplary embodiment of the present invention.

Next, FIG. 10B illustrates processing to be performed after the history button generated in FIG. 10A is pressed. In step S1005, after receiving an instruction to execute the history button from the screen input control unit 302, the screen display control unit 301 causes the home screen 401 to transition to the setting screen. FIG. 4 illustrates an example of the setting screen to be displayed in this case. When the home screen 401 is caused to transition to the setting screen, the record information including the setting contents and the file name is transmitted from the record management unit 304 to the screen display control unit 301.

In step S1006, upon receiving the instruction to execute the history button from the screen input control unit 302, the CPU 111 compares the selected file information received from the record management unit 304 with the file information received from the image processing apparatus file management unit 305, and determines whether files are identifiable.

If it is determined that all files are identified in step S1006 ("ALL FILES ARE IDENTIFIED" in step S1006), the processing proceeds to step S1007. In step S1007, the screen display control unit 301 displays the setting screen. FIG. 8B illustrates an example of the setting screen to be displayed in this case.

If it is determined that some of the files are identified in step S1006 ("SOME FILES ARE NOT IDENTIFIED" in step S1006), the processing proceeds to step S1008. In step S1008, the screen display control unit 301 displays the error screen 901. FIG. 9A illustrates an example of the error screen 901 to be displayed in this case.

In step S1006, if it is determined that none of the files are identified ("NO FILES ARE IDENTIFIED" in step S1006), the processing proceeds to step S1009. In step S1009, the CPU 111 determines whether the folder in which the files are stored is identifiable based on the selected file information received from the record management unit 304 and the file path information received from the image processing apparatus file management unit 305.

If it is determined that the folder is identified in step S1009 (YES in step S1009), the processing proceeds to step S1010. In step S1010, the screen display control unit 301 displays the file selection screen, and the error screen is displayed on the file selection screen. FIG. 9B illustrates an example of the screen to be displayed in this case. The list screen 903 illustrated in FIG. 9B displays a list of files stored in the folder identified in step S1009. When the OK button on the error screen 902 displayed in step S1010 is pressed, in step S1011, the list screen 903 is displayed.

In step S1009, if the image processing apparatus file management unit 305 determines that the folder is not identified (NO in step S1009), the processing proceeds to step S1012. In step S1012, the screen display control unit 301 displays the initial screen 906, and the error screen is displayed on the initial screen 906. FIG. 9C illustrates an example of the screen to be displayed in this case. When an OK button on the error screen 905 displayed in step S1012 is pressed, the initial screen 906 is displayed in step S1013. In the present exemplary embodiment, one of the determination results in step S1006 is "some of the plurality of files are not identified", but instead a determination result indicating that "some of the plurality of files are identified" may be set. While the present exemplary embodiment illustrates a case where a plurality of files is associated with a history button, one file may be associated with a history button. In this case, a determination as to "whether the file associated with the history button is identified" is made in step S1006, and if the file is identified, the processing proceeds to step S1007, and if the file is not identified, the processing proceeds to step S1009. This also holds true for the following exemplary embodiments.

By the processing described above, even when some of the files associated with the history button pressed by the user are not identified, the screen transitions to the setting screen 802 for executing processing on the identified files. This eliminates the need for reselecting the function or file corresponding to the history button, which leads to an improvement in user operability.

The first exemplary embodiment illustrates a screen transition when files corresponding to the history button are not identified, while a second exemplary embodiment illustrates a screen transition when the file name of a file is changed, which is one of the causes for not being able to identify the file.

Figure 11A:
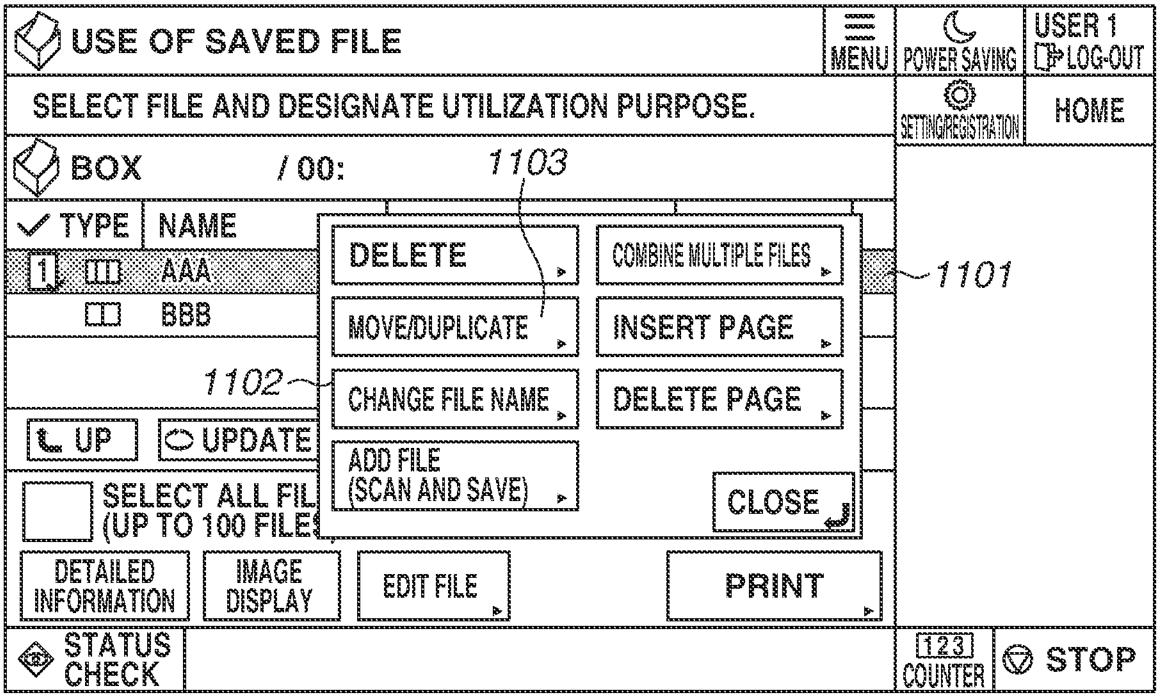
FIG. 11A illustrates an example of an operation screen for changing a file name according to the exemplary embodiment of the present invention.

FIG. 11A illustrates a screen for implementing a file editing function in the "use of saved file" function. The screen is displayed in such a manner that a file name change area 1102 for changing a file name, or a move/duplicate area 1103 for moving or duplicating a file can be selected by the user through a select operation 1101 on a file "AAA". A display method and a display form for each of the file name change area 1102 and the move/duplicate area 1103 are not particularly limited. A long tap operation, a touch operation, or the like may be performed on the file "AAA".

Figure 11B:
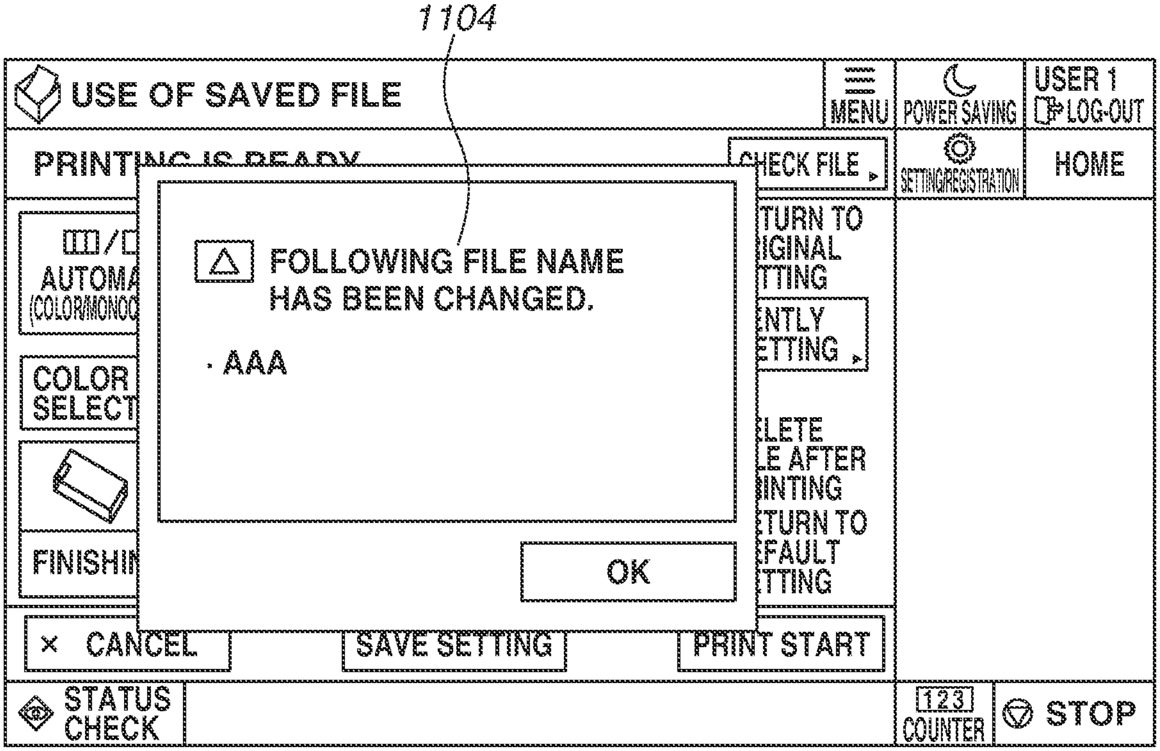
FIG. 11B illustrates an example of a notification screen according to the exemplary embodiment of the present invention.

A notification screen 1104 illustrated in FIG. 11B is displayed in a case where the file name of a file associated with a pressed history button or the file name of some of a plurality of files associated with the pressed history button has been changed when the history button is pressed by the user. Specifically, the notification screen 1104 is displayed in a case (FIG. 11A) where the file name is edited during a period between a time when the history button is registered on the timeline 404 and a time when the history button is pressed.

Figure 12A:
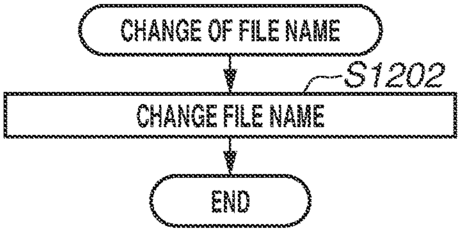
FIG. 12A illustrates a flow of processing for changing the file name according to the exemplary embodiment of the present invention.

A flow of processing to be performed when the file name is changed will be described with reference to FIG. 12A. Each step illustrated in FIG. 12A is performed in such a manner that the CPU 111 executes programs preliminarily stored in the ROM 113 or the external memory 121. The parts described above are denoted by the same reference numerals and the descriptions thereof are omitted.

In step S1202, the screen input control unit 302 instructs the image processing apparatus file management unit 305 to change the file name based on an instruction from the GUI component control unit 303. As a result of changing the file name, the record information in the record management unit 304 is managed in the following manner. That is, the record information is history information associated with the history button displayed on the timeline 404. Table 1 illustrates an example of the record information. The record information is basically the same as the record information (FIG. 18) to be described below, but differs from the record information illustrated in FIG. 18 in that the record information also includes a "changed file name" as an element, in addition to information for identifying the history button, a model type, a setting content, a "location" where a file is stored, a file name, and a "document ID" as an identifier for a file. As seen from the example illustrated in Table 1, two files are associated with record information corresponding to a history button C and the file name of the file identified by a document ID "0101" is changed from "AAA" to "XXX".

TABLE 1

Record Information in Second Exemplary Embodiment

| History Button | Model Type | Setting Contents | Location | File Name | Document ID | Changed File Name |
|---|---|---|---|---|---|---|
| History Button C | Use of Saved File: Print | Color: Automatic Sheet Size: A4 | /folder /aaa | AAA | 0101 | XXX |
| | | | | DDD | 0202 | |

Figure 12B:
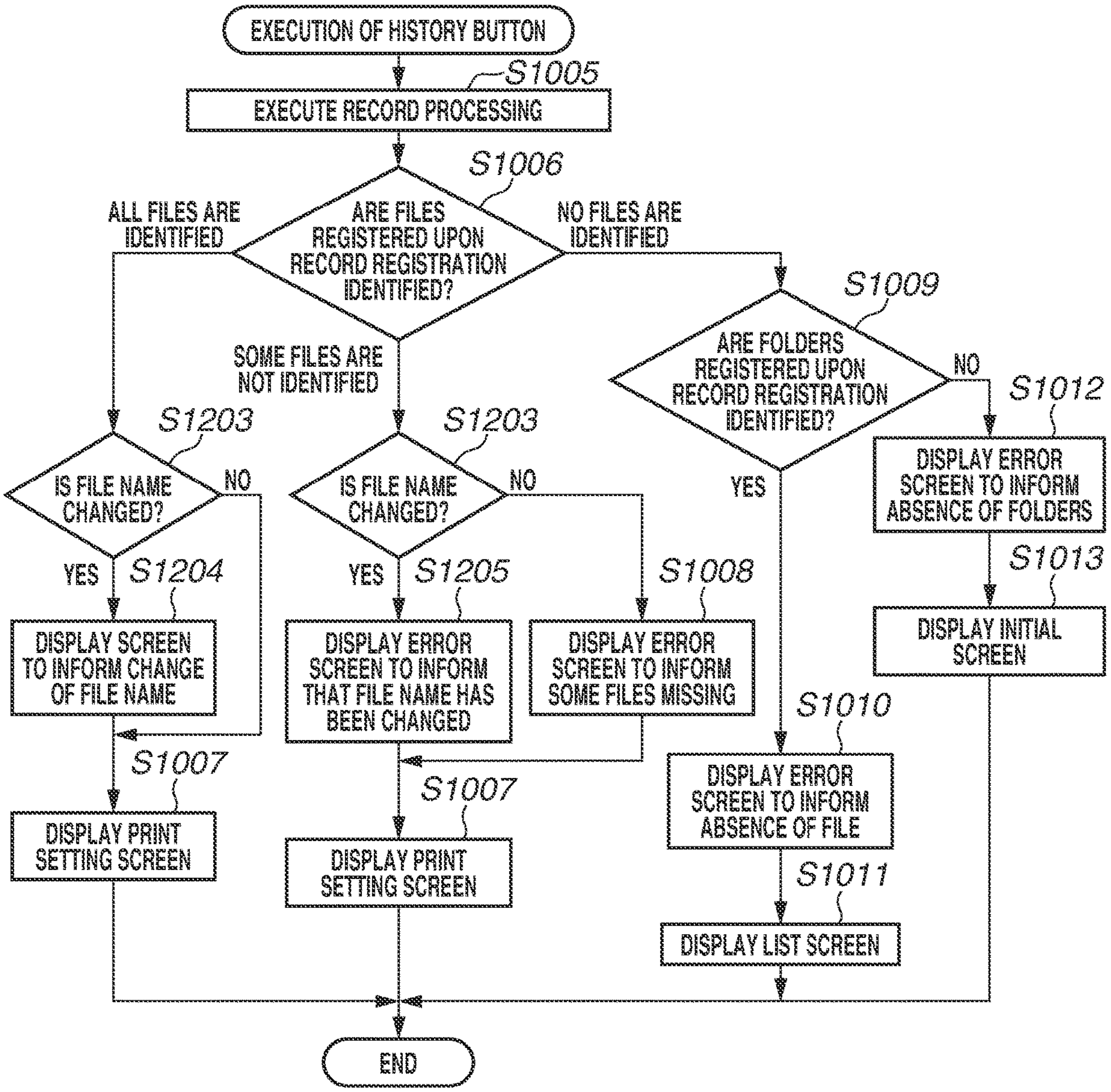
FIG. 12B is a flow of processing to be performed after the history button is pressed according to the exemplary embodiment of the present invention.

Next, a flow of processing to be performed when the notification screen is displayed will be described with reference to FIG. 12B.

In step S1006, if all the files associated with the history button are identified ("ALL FILES ARE IDENTIFIED" in step S1006), the processing proceeds to step S1203. In step S1203, the image processing apparatus file management unit 305 determines whether the file name has been changed. The determination as to whether the file name of the file has been changed may be made based on whether the "changed file name" illustrated in Table 1 includes a value, but instead the determination may be made based on a change flag that is separately provided. If it is determined that the file name has been changed (YES in step S1203), the processing proceeds to step S1205. In step S1205, the screen display control unit 301 displays a screen to inform that the file name has been changed as illustrated in FIG. 11B.

If some of the files associated with the history button are identified in step S1006 and it is determined that the file name has been changed in step S1203 (YES in step S1203), the processing proceeds to step S1205. In step S1205, the screen display control unit 301 displays a screen to inform that the file name has been changed. The screen to be displayed in this case may be the notification screen 1104 illustrated in FIG. 11B. Alternatively, in addition to the notification screen 1104 illustrated in FIG. 11B, an error message indicating that some of the files are not identified may also be displayed.

By the processing described above, a notification indicating that the file name of the file for which a job is executed has been changed can be sent to the user when the user presses the history button.

The first exemplary embodiment illustrates a screen transition when files corresponding to the history button are not identified, while a third exemplary embodiment illustrates a screen transition when a file is moved, which is one of the causes for not being able to identify the file.

Figure 13:
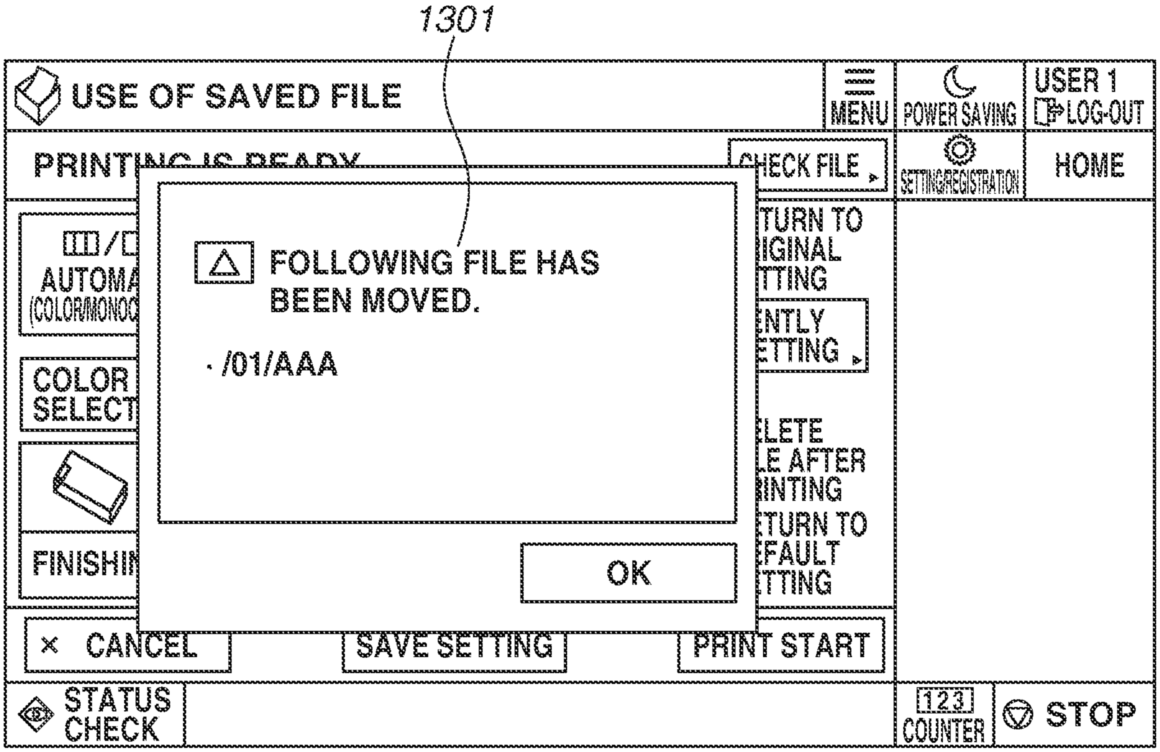
FIG. 13 illustrates an example of the notification screen according to the exemplary embodiment of the present invention.

FIG. 13 illustrates a notification screen 1301 to be displayed when a file has been moved and the user presses the history button associated with the moved file. The notification screen 1301 indicates that the file "AAA" in a folder "01" has been moved to another folder.

Figure 14A:
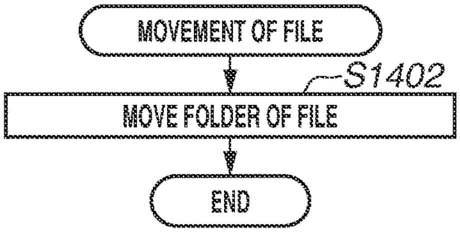
FIG. 14A illustrates a flow of processing for moving a file according to the exemplary embodiment of the present invention.

FIG. 14A illustrates a flow of processing to be performed when a file is moved. Each step illustrated in FIG. 14A is performed in such a manner that the CPU 111 executes programs preliminarily stored in the ROM 113 or the external memory 121. The parts described above are denoted by the same reference numerals and the descriptions thereof are omitted.

As a result of moving a file, the record information in the record management unit 304 is managed in the following manner. That is, the record information differs from the record information illustrated in Table 1 in that the record information includes a "location after movement" indicating a movement destination of the file. As seen from an example illustrated in Table 2, two files are associated with the record information corresponding to the history button C and the file identified by the document ID "0101" is moved to a folder "/01/AAA".

TABLE 2

Record Information in Third Exemplary Embodiment

| History Button | Model Type | Setting Contents | Location | File Name | Document ID | Location After Movement |
|---|---|---|---|---|---|---|
| History Button C | Use of Saved File: Print | Color: Automatic Sheet Size: A4 | /folder /aaa | AAA | 0101 | /01/AAA |
| | | | | DDD | 0202 | |

In step S1402, the screen input control unit 302 instructs the image processing apparatus file management unit 305 to move the file based on an instruction from the GUI component control unit 303.

Figure 14B:
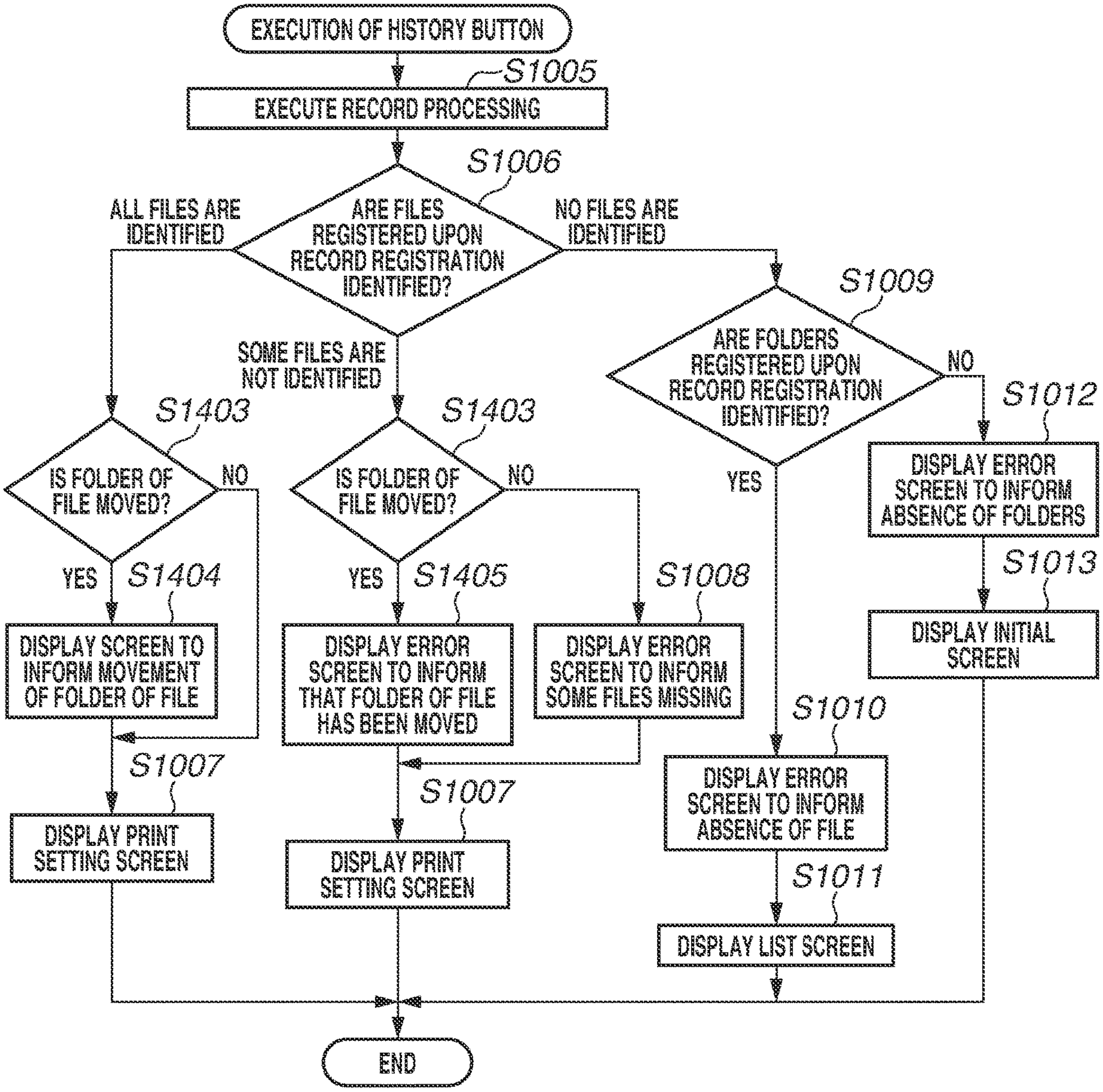
FIG. 14B illustrates a flow of processing to be performed after the history button is pressed according to the exemplary embodiment of the present invention.

Next, a flow of processing to be performed when the notification screen 1301 is displayed will be described with reference to FIG. 14B.

In step S1006, if the image processing apparatus file management unit 305 determines that all the files are identified (YES in step S1006), the processing proceeds to step S1403. In step S1403, it is determined whether the file managed by the image processing apparatus file management unit 305 has been moved to another folder. In step S1403, if it is determined that the file has been moved (YES in step S1403), the processing proceeds to step S1404. In step S1404, the screen display control unit 301 displays the notification screen 1301. The determination as to whether the file is moved in step S1403 may be made based on whether the "location after movement" illustrated in Table 2 includes a value, but instead the determination may be made based on a movement flag that is separately provided.

After determining that some of the files associated with the history button are identified in step S1006, in step S1403, it is determined whether the file has been moved to another folder. In step S1403, if it is determined that the file has been moved (YES in step S1403), the processing proceeds to step S1405. In step S1405, the screen display control unit 301 displays the notification screen 1301. The screen to be displayed in this case may be the notification screen 1301 illustrated in FIG. 13. Alternatively, in addition to the notification screen 1301 illustrated in FIG. 13, an error message indicating that some of the files are not identified may also be displayed.

By the processing described above, a notification indicating that the file has been moved can be sent to the user when the history button associated with the moved file is pressed.

The first exemplary embodiment illustrates a screen transition when files corresponding to the history button are not identified, while a fourth exemplary embodiment illustrates a screen transition when a file is duplicated and a duplication source file, from which the file is duplicated, is deleted, which is one of the causes for not being able to identify the file.

Figure 15:
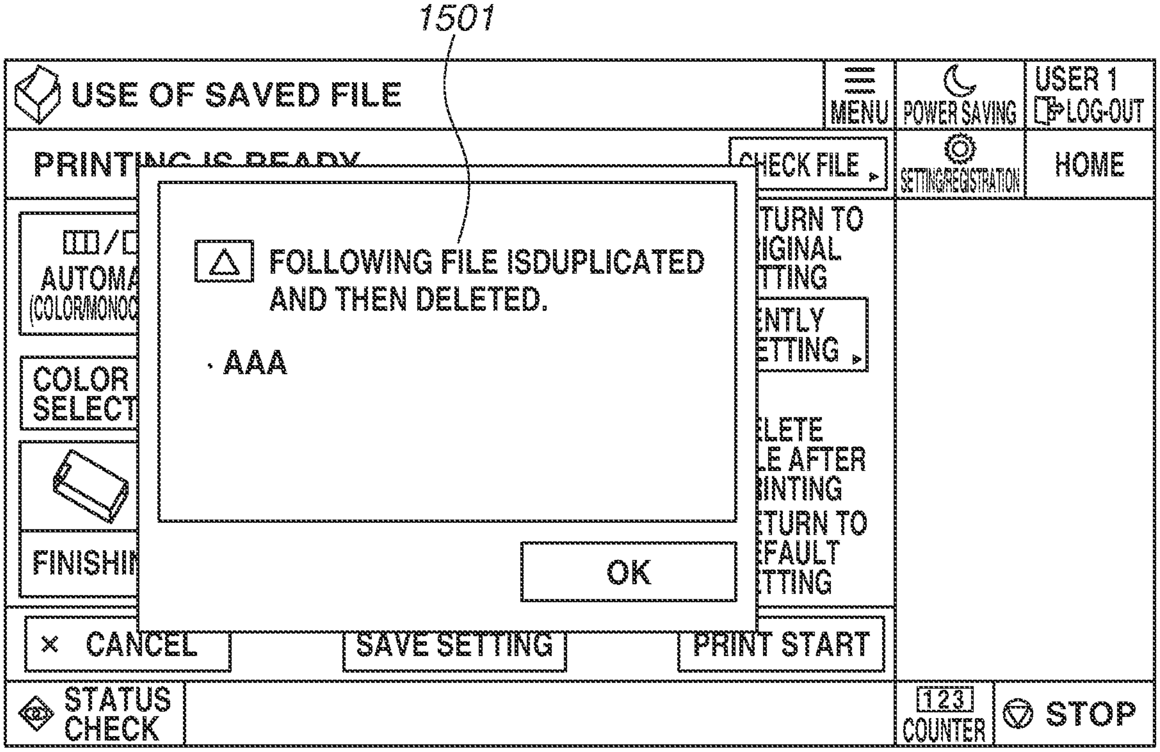
FIG. 15 illustrates an example of the notification screen according to the exemplary embodiment of the present invention.

FIG. 15 illustrates an example of a notification screen 1501 to be displayed when the user presses the history button in a case where a file is duplicated and the duplication source file is deleted since record registration. The notification screen 1501 displays the file name "AAA" of the file that is duplicated and deleted.

Figure 16A:
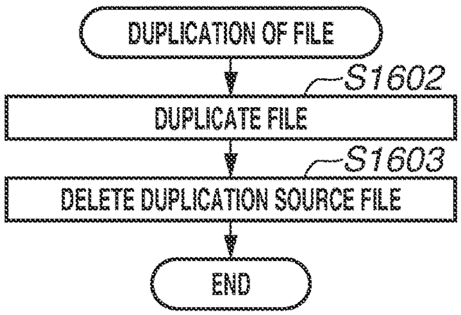
FIG. 16A illustrates a flow of processing for duplicating a file according to the exemplary embodiment of the present invention.
Figure 16B:
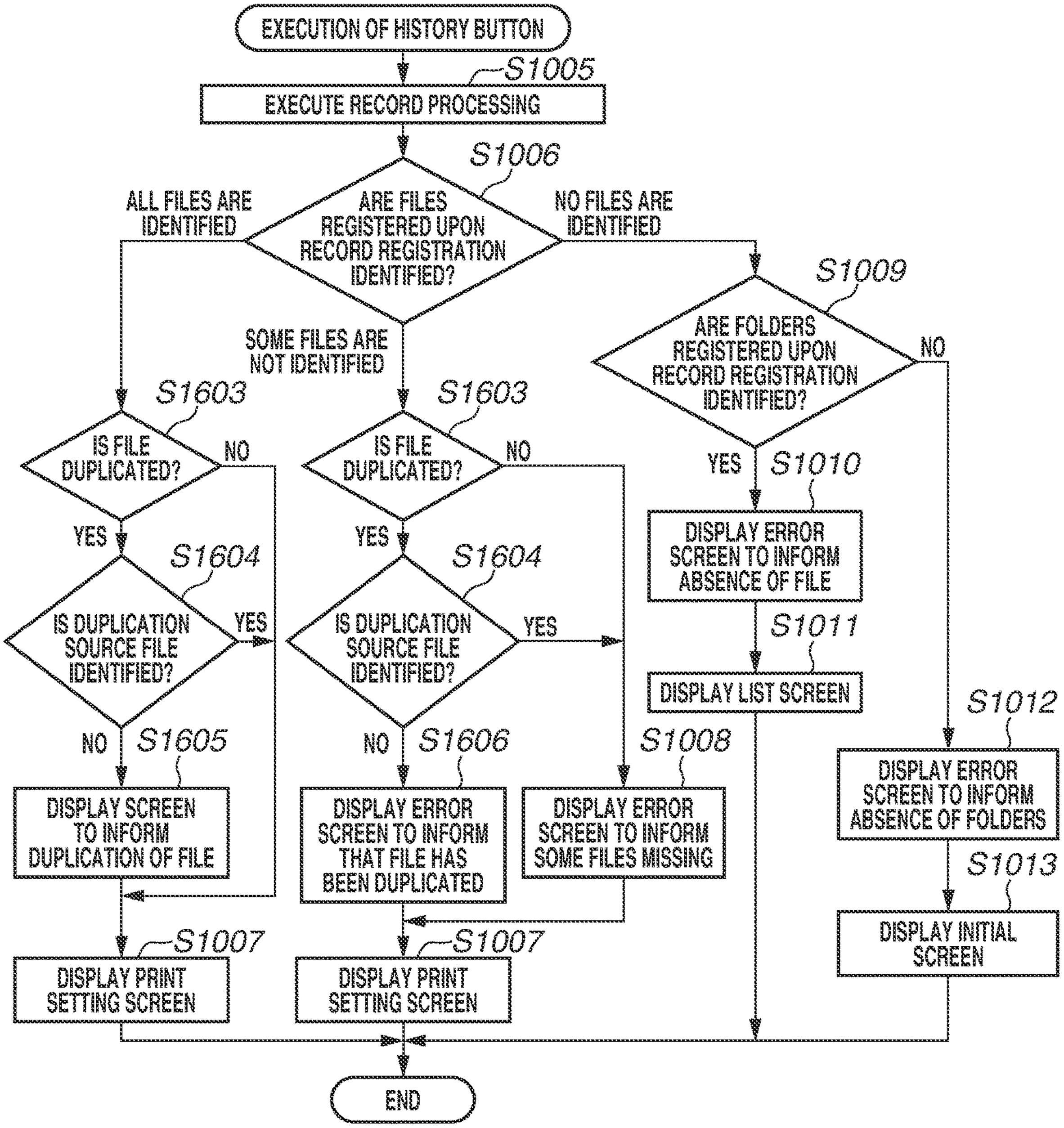
FIG. 16B illustrates a flow of processing to be performed after the history button is pressed according to the exemplary embodiment of the present invention.

A flow of processing to be performed when a file is duplicated and deleted will be described with reference to FIG. 16A. Each step illustrated in FIGS. 16A and 16B is performed in such a manner that the CPU 111 executes programs preliminarily stored in the ROM 113 or the external memory 121. The parts described above are denoted by the same reference numerals and the descriptions thereof are omitted.

In step S1602, based on an instruction received from the GUI component control unit 303, the screen input control unit 302 instructs the image processing apparatus file management unit 305 to duplicate a file. Further, in step S1603, the screen input control unit 302 instructs the image processing apparatus file management unit 305 to delete the duplication source file.

As a result of moving the file, the record information in the record management unit 304 is managed in the following manner. The record information differs from the record information illustrated in Tables 1 and 2 in that the record information includes a "document ID after duplication" indicating the document ID of the duplicated file. As seen from an example illustrated in Table 3, two files are associated with the record information corresponding to the history button C, the file identified by the document ID "0101" is duplicated, and the document ID of the newly created file is "0101-1".

TABLE 3

Record Information in Fourth Exemplary Embodiment

| History Button | Model Type | Setting Contents | Location | File Name | Document ID | Document ID After Duplication |
|---|---|---|---|---|---|---|
| History Button C | Use of Saved File: Print | Color: Automatic Sheet Size: A4 | /folder /aaa | AAA | 0101 | 0101-1 |
| | | | | DDD | 0202 | |

Next, a flow of processing for displaying the notification screen 1501 will be described with reference to FIG. 16B. If all the files associated with the history button are identified in step S1006 ("ALL FILES ARE IDENTIFIED" in step S1006), the processing proceeds to step S1603. In step S1603, the image processing apparatus file management unit 305 determines whether the file has been duplicated. The determination as to whether the file has been duplicated may be made based on whether the "document ID after duplication" illustrated in Table 3 includes a value, but instead the determination may be made based on a duplication flag that is separately provided. If the file has been duplicated (YES in step S1603), the processing proceeds to step S1604. In step S1604, the image processing apparatus file management unit 305 determines whether the duplication source file is identified. If the duplication source file is not identified (NO in step S1604), the processing proceeds to step S1007. In step S1007, the screen display control unit 301 displays the notification screen 1501.

If some of the files associated with the history button are identified in step S1006 ("SOME FILES ARE NOT IDENTIFIED" in steps S1603) and it is determined that the duplication source is not identified in steps S1603 and S1604, the screen display control unit 301 displays the notification screen 1501. The screen to be displayed in this case may be the notification screen 1501 illustrated in FIG. 15. Alternatively, in addition to the notification screen 1501 illustrated in FIG. 15, an error message indicating that some of the files are not identified may also be displayed.

On the other hand, if some of the files associated with the history buttons are identified in step S1006 ("SOME FILES ARE NOT IDENTIFIED" in steps S1603) and it is determined that the duplication source file is identified in steps S1603 and S1604, a notification indicating that some of the files associated with the history buttons are not identified is sent as illustrated in FIG. 9A.

By the processing described above, when the history button associated with the file that has been duplicated and deleted is pressed, a notification indicating that the file has been duplicated and deleted can be sent to the user.

The exemplary embodiment described above illustrates the error screen 901 to be displayed when some of the files associated with the history button are not identified, while a fifth exemplary embodiment illustrates the software key "check file" that is included in the error message on the error screen 901 and causes the user to check the identified files.

<Record Information>

Record information stored in the record management unit 304 of the image processing apparatus 101 will be described with reference to FIG. 18.

A "history button" column indicates information for identifying the history button to which the record information is allocated. The present exemplary embodiment illustrates an example of the record information corresponding to history buttons (history buttons A and B) displayed on the timeline 404. Basically, one setting content and one or more files are associated with one history button.

A "function type" column indicates information indicating a function type to be allocated to each history button. In the example illustrated in FIG. 18, "print" in the "use of saved file" function is associated with the function type corresponding to a history button A. Other examples of the function type may include "transmit" in the "use of saved file" function, a "copy" function, a "scan and transmit" function, and a "scan and save" function.

A "setting" column indicates information about setting contents for a job. In the example illustrated in FIG. 18, a "setting 1" column indicates information about a color setting and a "setting 2" column indicates information about a sheet size setting. A " . . . " column indicates other settings. For example, in the case of a history button, the "setting" column may include information about the date and time when processing is executed, which is illustrated in a simplified manner in FIG. 18.

A "location" column indicates a file storage location, and a "file name" column indicates a file name. Specifically, the history button A is a history button for executing printing based on setting contents (color: automatic, sheet size: A4, other settings) for seven files of A.pdf to Q.pdf stored in "/folder/aaa".

A "document ID" column indicates an identifier (document ID) associated with each file. A management destination of the file identified by "location" manages the file by using the file name or the document ID, or by using both the file name and the document ID. As seen from the example illustrated in FIG. 18, the file is managed using only the file name in "/folder/aaa" and the file is managed using both the file name and the document ID in "/folder/bbb".

In the case of managing each file using the document ID, the file can be identified by the document ID even when the file name is changed. In other words, when the corresponding history button is pressed, the file corresponding to the history button can be identified by the document ID and the function corresponding to the history button can be executed. However, in the case of managing the file by using only the file name, if the file name is changed, the file cannot be identified and thus the function corresponding to the history button cannot be executed.

<Setting Screen>

Figure 19:
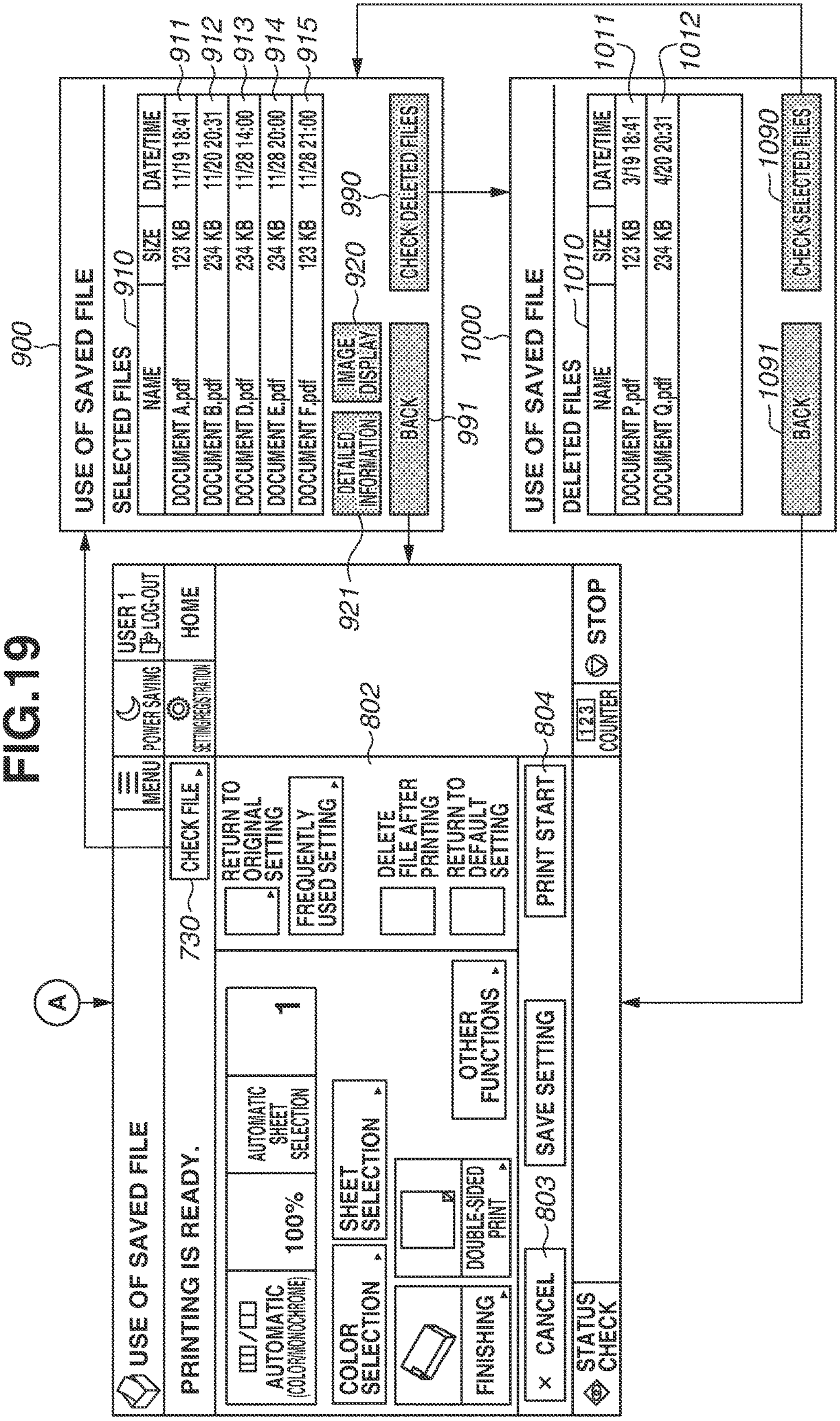
FIG. 19 illustrates an example of the screen transition according to the exemplary embodiment of the present invention.

A button 730 is displayed on the setting screen 802 illustrated in FIG. 19. When the button 730 is pressed, the screen transitions to a list screen 900. Then, when a button 990 on the list screen 900 is pressed, the screen transitions to a check screen 1000.

The button 730 may not be displayed when the software key transitions from the software key "use of saved file" on the home screen 401. This is because, when the software key is pressed, the screen transitions to the setting screen 802 after the file for which a job is executed is selected as illustrated in FIG. 4, which eliminates the need for providing an operation unit (button 730) to check the file for which the job is executed on the setting screen 802 again.

<List Screen>

A list 910 on the list screen 900 displays executable files (identified files) among the files associated with the history buttons selected on the home screen 401. The list 910 is a screen that can receive a flick operation. The list 910 may be configured to display files that are not displayed in FIG. 19 by a flick operation.

When the button 990 is pressed, the check screen 1000 for checking the files that are not identified is displayed. The check screen 1000 is a screen for displaying a list of files that are not identified when the history button is pressed again among the files for which printing was executed at a time point when the history button was created. Information about the files displayed on the check screen 1000 is displayed based on the record information corresponding to the history button. When a button 991 is pressed, the screen returns to the setting screen 802 which is displayed before the button 730 is pressed. Buttons 920 and 921 are respectively similar to the buttons 831 and 832 illustrated in FIG. 4 and thus the descriptions thereof are omitted. Display contents in the list 910 and a list 1010 are determined with reference to the record information.

<File Check Screen>

The check screen 1000 illustrated in FIG. 19 is an example of the screen to be displayed when the button 990 on the list screen 900 is pressed. The check screen 1000 is a screen for checking the files, which cannot be identified due to some reasons, among the files for which printing is executed at a time point when the history button is created. The list 1010 displays a list of files that cannot be identified. According to the example of the list 1010, the document P.pdf and the document Q.pdf which are associated with the history button cannot be referenced when the corresponding history button is pressed again, and thus printing cannot be executed on the document P.pdf and the document Q.pdf. When a button 1090 is pressed, the screen returns to list screen 900. When the button 1091 is pressed, the screen returns to the setting screen 802.

The present exemplary embodiment illustrates a configuration in which identified files and unidentified files among the files associated with the history button are displayed on different screens (900 and 1000). However, the configuration is not particularly limited. Identified files and unidentified files may be displayed in a mixed manner on one screen. In this case, identified files and unidentified files are displayed in a distinguishable manner by, for example, displaying unidentified files in a grayed-out manner. In the case of displaying both identified files and unidentified files on one screen, the detailed information (921) or the screen display (920) may be displayed in a grayed-out manner based on whether the files selected in the list 910 are identified.

The present exemplary embodiment illustrates a configuration in which the list screen 900 is displayed when the button 730 displayed on the setting screen 802 is pressed. However, the files for which the function cannot be executed may be preferentially displayed by displaying the check screen 1000 instead of displaying the list screen 900.

<Pop-Up Screen>

Figure 20:
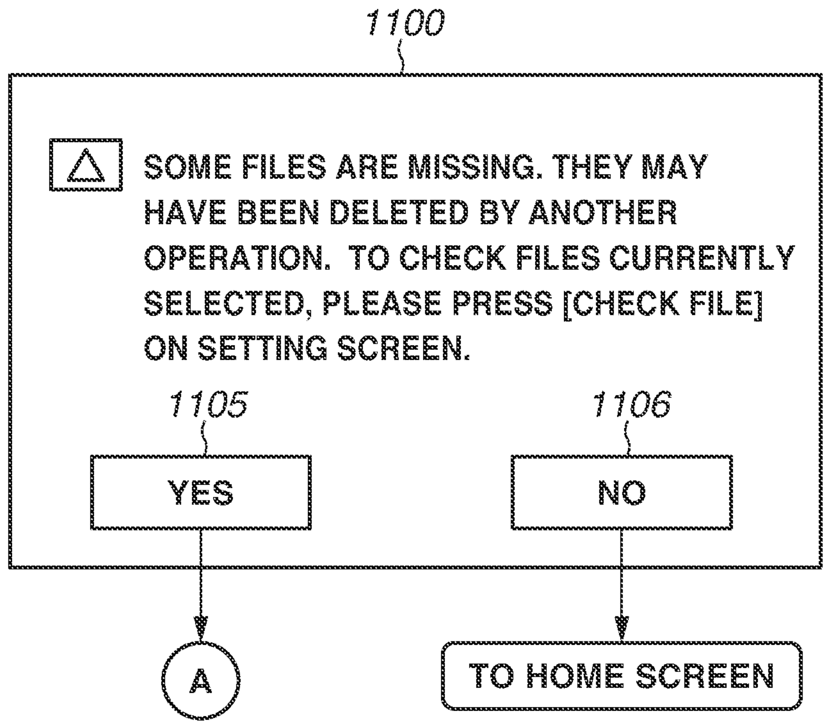
FIG. 20 illustrates an example of a pop-up screen according to the exemplary embodiment of the present invention.

A pop-up screen 1100 illustrated in FIG. 20 is a message screen to be displayed in a case where some of the files for which printing is executed are not identified when the history button is pressed. The configuration of the pop-up screen 1100 is different from the configuration of the screen illustrated in FIG. 9A.

The pop-up screen 1100 is an example of the screen to be displayed when some of a plurality of files associated with the pressed history button are missing. When a button 1105 is pressed, the screen transitions to the setting screen 802. The setting contents associated with the history button are reflected in the setting contents of the setting screen 802 to be displayed in this case, and the setting contents to be reflected are not changed even when some of the files for which printing is executed are not identified. When a button 1106 is pressed, the screen returns to the home screen 401.

<Detailed Information Screen>

Figure 21:
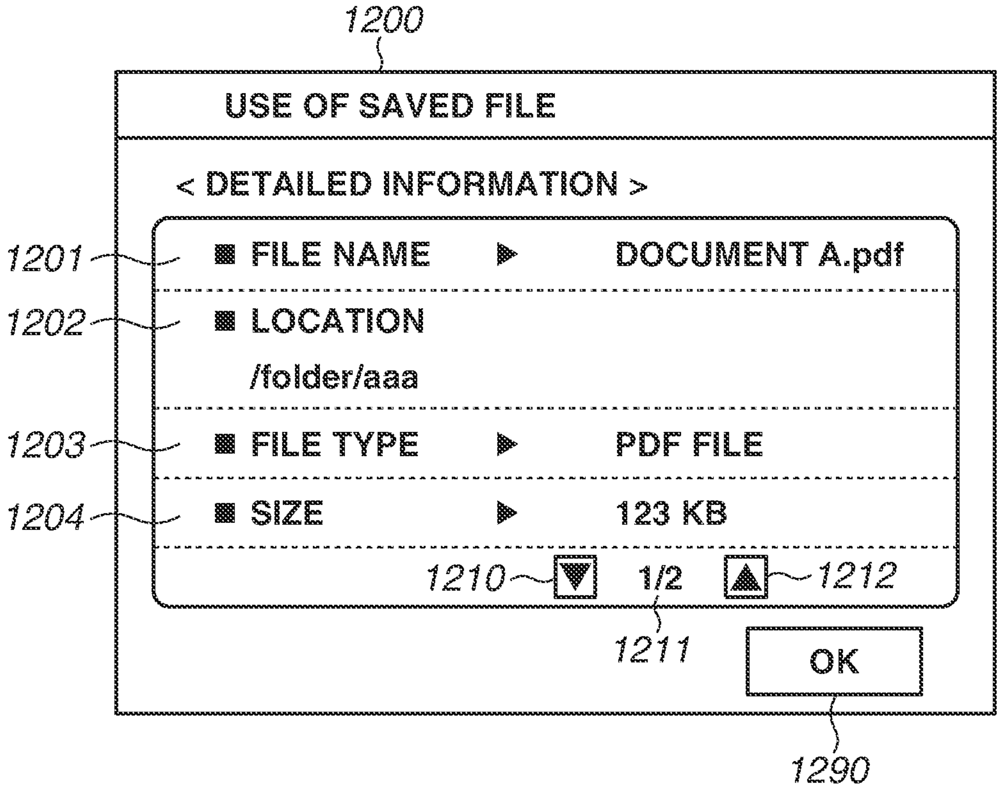
FIG. 21 illustrates an example of detailed information according to the exemplary embodiment of the present invention.

A detailed information screen 1200 illustrated in FIG. 21 is an example of the screen to be displayed when the button 832 on the list screen 800 and the button 921 on the list screen 900 are pressed. Detailed information about files selected in the list 810 is displayed on the detailed information screen 1200. A row 1201 indicates a file name, and a row 1202 indicates a file storage location. A row 1203 indicates a file type of the document, and a row 1204 indicates a file size. Buttons 1210 and 1212 are buttons for bringing the detailed information, which is not displayed in FIG. 21, into a display state. A display area 1211 indicates the number of pages of the detailed information and the current page. The example illustrated in FIG. 21 shows that the total number of pages is two and the first page is currently displayed. When a button 1290 is pressed, the screen returns to the screen (for example, the list screen 800 or the list screen 900) that is displayed before the detailed information screen 1200 is displayed.

<Preview Screen>

Figure 22:
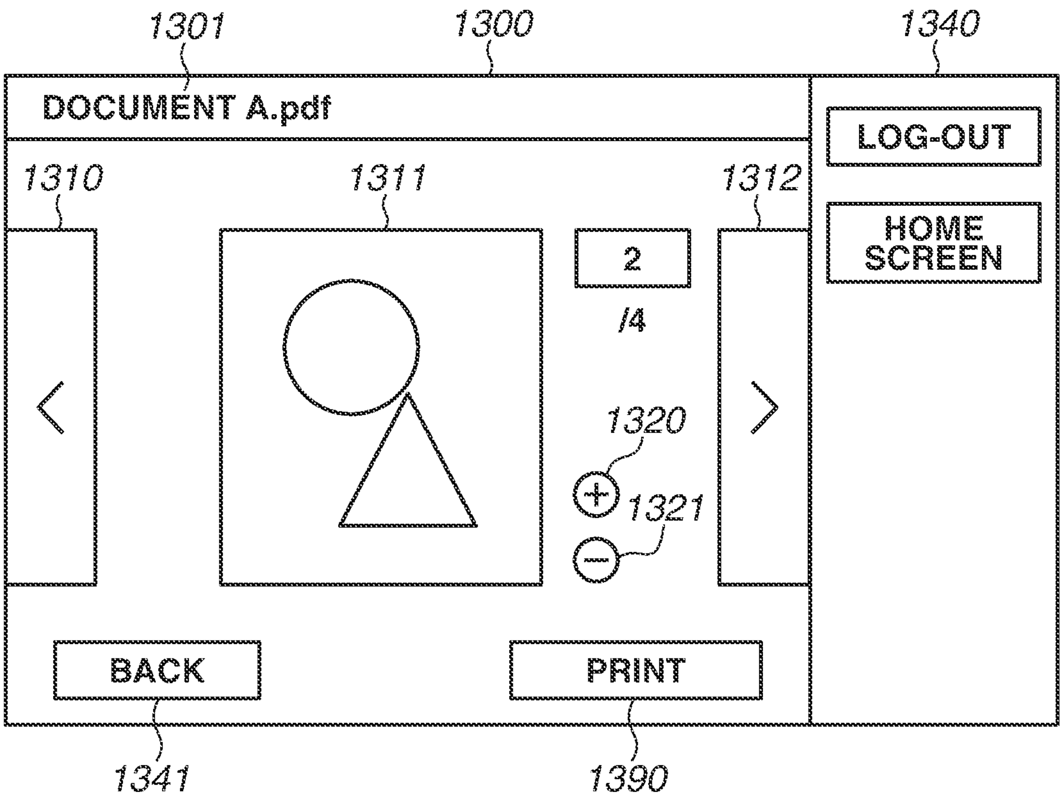
FIG. 22 illustrates an example of a preview screen according to the exemplary embodiment of the present invention.

A preview screen 1300 illustrated in FIG. 22 is a screen to be displayed when the button 831 on the list screen 800 and the button 920 on the list screen 900 are pressed, and displays a preview of the file in the selected state on the list screen 800 or the list screen 900. The notification screen 1301 displays the file name of the file selected on the list screen 800 or the list screen 900. Pages 1310, 1311, and 1312 are different pages to be displayed when the file includes a plurality of pages and are displayed in ascending order of page. To switch the pages, a horizontal flick operation is performed in the case of the preview screen 1300. Buttons 1320 and 1321 are used to enlarge or reduce the size of a preview image displayed at the center of the screen. Even when the preview image displayed at the center of the screen is switched by the flick operation, positions where the buttons 1320 and 1321 and buttons 1341 and 1390 are displayed are not changed. When the button 1341 is pressed, the screen returns to the screen (for example, the list screen 800 or the list screen 900) which is displayed before the current screen is displayed. When the button 1390 is pressed, printing is executed on the file for which the preview image is displayed.

A display area 1340 is where the user name and history buttons are displayed on the home screen 401. On the display area 1340, a log-out button and a button for returning to the home screen 401 are arranged. Thus, even when the screen area is divided and various operation screens are displayed, the divided areas may be maintained, or the display area may be displayed on the entire screen of the display 120 of the image processing apparatus 101 without maintaining the divided areas. Whether to maintain the divided areas may be determined depending on the contents of processing performed by the user.

According to the fifth exemplary embodiment, it is possible to check identified files among the files associated with the history button on the list screen 900.

OTHER EMBODIMENTS

While the exemplary embodiments described above illustrate the print function in the "use of saved file" function, the present invention is also applicable to a function of transmitting data to an external server. In this case, the setting screen 802 is a setting screen for executing the transmission function.

Further, on the setting screen 802 to be displayed after the history button 801 is pressed, the file name of the file associated with the pressed history button may be displayed. In this case, if there is a plurality of files to be associated with the pressed history button, only the file name of one of the files may be displayed on the setting screen 802 and the file names of the other files can be checked by pressing the "check file" button 730.

The first exemplary embodiment illustrates a configuration in which it is determined whether the folder is identifiable in step S1009 and the list screen or the initial screen is displayed depending on the determination result. Alternatively, a configuration in which the list screen (or the initial screen) is displayed at a time point when it is determined that files associated with the history button are not identifiable in step S1006 without executing the processing of step S1009 can also be employed.

The present invention has been described in detail above based on exemplary embodiments of the present invention. However, the present invention is not limited to the specific exemplary embodiments described above, and various modes are also included in the present invention without departing from the scope of the invention. Further, some of the exemplary embodiments described above can be combined as appropriate.

Furthermore, the image processing apparatus 101 described above includes various apparatuses. Examples of the image processing apparatus 101 include not only a PC, a personal digital assistant (PDA), and a mobile phone, but also a printer, a scanner, a facsimile (FAX) machine, a copying machine, an MFP, a camera, a video camera, and other image viewers.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-214683, filed Nov. 15, 2018, which is hereby incorporated by reference herein in its entirety.

What is claimed is:

1. An image processing apparatus having a plurality of functions including a first function, the first function being a function of printing at the image processing apparatus a plurality of files selected from among files stored in an external server or the image processing apparatus, or transmitting the selected plurality of files to a transmission destination, the image processing apparatus comprising:

at least one memory storing instructions; and at least one processor that, when executing the instructions, causes the image processing apparatus to:

display, on a screen on which a first software key for activating functions of the image processing apparatus is displayed, a second software key that is to be displayed based on execution of processing of the first function and is to be used for instructing that the processing of the first function be executed again for the plurality of files in accordance with a setting content of the processing executed; and refer to a plurality of files associated with the second software key, wherein, even in a case where a file that is not able to be referred to is included in the selected plurality of files when the second software key is operated, the processing of the first function is executed for referred-to files among the selected plurality of files when the operation is performed.

2. The image processing apparatus according to claim 1, wherein, in a case where a folder in which the plurality of files is stored is not identified, a selection screen for prompting a user to select a storage destination of a file on which the processing is executed is displayed.

3. The image processing apparatus according to claim 2, wherein, in a case where a folder in which the plurality of files exists is not identified, the selection screen is displayed after transmission of a notification indicating that the folder has not been identified.

4. The image processing apparatus according to claim 1, wherein, in a case where the plurality of files are not able to be referred, in response to operation of the second software key, a list screen for displaying a list of files stored in one of the external server and the image processing apparatus is displayed, the list screen being used to prompt a user to select a file on which the processing is executed.

5. The image processing apparatus according to claim 4, wherein, after a file is selected on the list screen, the setting content for executing the processing on the file selected on the list screen is displayed.

6. The image processing apparatus according to claim 1, wherein, in a case where some of the plurality of files are not able to be referred when the second software key is operated, the setting content is displayed after transmission of a notification indicating the files that have not been stored.

7. The image processing apparatus according to claim 1, wherein a setting content associated with the second software key selected by a user is reflected in a setting screen for displaying the setting content.

8. The image processing apparatus according to claim 1, wherein, in a case where some of the plurality of files are not able to be referred, in response to operation of the second software key, the setting content of the processing is displayed.

9. The image processing apparatus according to claim 1, further comprising a first operation unit that displays the files stored in the external server or the image processing apparatus in a case where the plurality of files are not able to be referred.

10. The image processing apparatus according to claim 9, wherein, on a screen that is displayed in response to selection of the first operation unit, a second operation unit and a third operation unit are displayed together with a list of the files stored in the external server or the image processing apparatus, wherein the second operation unit is an operation unit that enables a preview image of the files displayed in the list to be displayed, and the third operation unit is an operation unit that enables information about the files displayed in the list to be displayed.

11. The image processing apparatus according to claim 1, wherein in response to operation of the second software key, the processing of the first function is not executed for, among the selected plurality of files, files that are not able to be referred when the operation is performed.

12. The image processing apparatus according to claim 1, wherein the plurality of files associated with the second software key is identified, and in a case where files that are not able to be referred are included in the identified plurality of files, in response to operation of the second software key, the processing of the first function is executed for, among the selected plurality of files, files that are stored in the external server or the image processing apparatus when the operation is performed.

13. A control method for an image processing apparatus having a plurality of functions including a first function, the first function being a function of printing at the image processing apparatus a plurality of files selected from among files stored in an external server or the image processing apparatus, or transmitting the selected plurality of files to a transmission destination, the control method comprising:

displaying, on a screen on which a first software key for activating a function of the image processing apparatus is displayed, a second software key that is to be displayed based on execution of processing of the first function and is to be used for instructing that the processing of the first function be executed again for the plurality of files in accordance with a setting content of the processing executed; and referring to a plurality of files associated with the second software key, wherein, even in a case where a file that is not able to be referred to is included in the selected plurality of files when the second software key is operated, the processing of the first function is executed for referred-to files among the selected plurality of files when the operation is performed.

14. An image processing apparatus having a plurality of functions including a first function, the first function being a function of printing at the image processing apparatus a plurality of files selected from among files stored in an external server or the image processing apparatus, or transmitting the selected plurality of files to a transmission destination, the image processing apparatus comprising:

at least one memory storing instructions; and at least one processor that, when executing the instructions, causes the image processing apparatus to:

display, on a screen on which a first software key for activating functions of the image processing apparatus is displayed, a second software key that is to be displayed based on execution of processing of the first function and is to be used for instructing that the processing of the first function be executed again for the plurality of files in accordance with a setting content of the processing executed; and refer to a plurality of files associated with the second software key, wherein, in a case where a file that is not able to be referred to is included in the selected plurality of files when the second software key is operated, after a notification screen that notifies the file that is not able to be referred is displayed, a setting screen of the first function is displayed.

15. The image processing apparatus according to claim 14, wherein, in a case where the plurality of files is not stored in the external server or the image processing apparatus, in response to operation of the second software key, a list screen for displaying a list of files stored in one of the external server and the image processing apparatus is displayed, the list screen being used to prompt a user to select a file on which the processing is executed.

16. The image processing apparatus according to claim 15, wherein, after a file is selected on the list screen, the setting content for executing the processing on the file selected on the list screen is displayed.

17. The image processing apparatus according to claim 14, wherein after an execution instruction of processing is received on the setting screen, a file that is able to be referred is subject to the processing of the first function.

18. The image processing apparatus according to claim 14, wherein the setting screen is a setting screen for executing the processing of the first function to a part of the plurality of files, the part being able to be referred.

19. A control method for an image processing apparatus having a plurality of functions including a first function, the first function being a function of printing at the image processing apparatus a plurality of files selected from among files stored in an external server or the image processing apparatus, or transmitting the selected plurality of files to a transmission destination, the control method comprising:

displaying, on a screen on which a first software key for activating functions of the image processing apparatus is displayed, a second software key that is to be displayed based on execution of processing of the first function and is to be used for instructing that the processing of the first function be executed again for the plurality of files in accordance with a setting content of the processing executed; and referring to a plurality of files associated with the second software key, wherein, in a case where a file that cannot be referred to is included in the selected plurality of files when the second software key is operated, after a notification screen that notifies the file that is not able to be referred is displayed, setting screen of the first function is displayed.

* * * * *